(12) United States Patent
Gonda et al.

(10) Patent No.: US 10,700,328 B2
(45) Date of Patent: Jun. 30, 2020

(54) NICKEL-ZINC BATTERY CELL PACK AND BATTERY PACK USING SAME

(71) Applicant: NGK INSULATORS, LTD., Nagoya-Shi (JP)

(72) Inventors: Yuichi Gonda, Nagoya (JP); Kenshin Kitoh, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 169 days.

(21) Appl. No.: 15/824,127

(22) Filed: Nov. 28, 2017

(65) Prior Publication Data

US 2018/0083246 A1 Mar. 22, 2018

Related U.S. Application Data

(63) Continuation of application No. PCT/JP2016/067120, filed on Jun. 8, 2016.

(30) Foreign Application Priority Data

Jun. 15, 2015 (JP) .................................. 2015-120260

(51) Int. Cl.
*H01M 2/00* (2006.01)
*H01M 2/16* (2006.01)
(Continued)

(52) U.S. Cl.
CPC ....... *H01M 2/1646* (2013.01); *H01M 2/0275* (2013.01); *H01M 2/1016* (2013.01);
(Continued)

(58) Field of Classification Search
CPC ............. H01M 2/1646; H01M 2/1686; H01M 10/0562; H01M 4/523; H01M 4/366;
(Continued)

(56) References Cited

U.S. PATENT DOCUMENTS 3,703,417 A * 11/1972 Rosa et al. ............. H01B 3/002
429/139
6,183,900 B1 2/2001 Bronoel et al.
(Continued)

FOREIGN PATENT DOCUMENTS

CN 102437339 A 5/2012
CN 104067437 A 9/2014
(Continued)

OTHER PUBLICATIONS

International Search Report and Written Opinion (Application No. PCT/JP2016/067120) dated Sep. 13, 2016.
(Continued)

*Primary Examiner* — Nicholas P D'Aniello
(74) *Attorney, Agent, or Firm* — Burr & Brown, PLLC

(57) ABSTRACT

The present invention provides a unit cell for a nickel-zinc battery in the form of a cell pack having positive and negative electrodes reliably separated by a hydroxide ion-conductive separator, which can be readily handled and is very advantageous for forming an assembled battery. The nickel-zinc cell pack of the invention includes: a flexible bag comprising flexible films; a separation sheet liquid-tightly connected to the interior of the flexible bag to separate a positive-electrode chamber and a negative-electrode chamber for inhibiting liquid communication therebetween; a positive electrode and a positive-electrode electrolytic solution disposed in the positive-electrode chamber; a negative electrode and a negative-electrode electrolytic solution disposed in the negative-electrode chamber, wherein the separation sheet comprises a separator structure comprising a separator exhibiting hydroxide-ion conductivity and water impermeability.

17 Claims, 15 Drawing Sheets

(51) Int. Cl.
*H01M 10/30* (2006.01)
*H01M 2/02* (2006.01)
*H01M 2/10* (2006.01)
*H01M 4/36* (2006.01)
*H01M 4/38* (2006.01)
*H01M 4/48* (2010.01)
*H01M 4/52* (2010.01)
*H01M 10/0562* (2010.01)

(52) U.S. Cl.
CPC ......... *H01M 2/1686* (2013.01); *H01M 4/364* (2013.01); *H01M 4/366* (2013.01); *H01M 4/38* (2013.01); *H01M 4/483* (2013.01); *H01M 4/523* (2013.01); *H01M 10/0562* (2013.01); *H01M 10/30* (2013.01); *H01M 2/0212* (2013.01); *H01M 2300/0014* (2013.01); *H01M 2300/0068* (2013.01)

(58) Field of Classification Search
CPC .. H01M 2/0275; H01M 2/1016; H01M 4/364; H01M 4/38; H01M 4/483; H01M 10/30; H01M 2/0212; H01M 2300/0068; H01M 2300/0014
See application file for complete search history.

(56) References Cited

U.S. PATENT DOCUMENTS

| | | | |
|---|---|---|---|
| 9,680,135 B2 | 6/2017 | Lee et al. | |
| 10,128,542 B2 * | 11/2018 | Hayashi | H01M 2/16 |
| 10,263,292 B2 * | 4/2019 | Hayashi | H01M 2/16 |
| 10,276,896 B2 * | 4/2019 | Hayashi | H01M 2/16 |
| 2005/0208381 A1 * | 9/2005 | Boulton | H01M 2/0267 429/234 |
| 2014/0315099 A1 * | 10/2014 | Yamada | H01M 10/24 429/304 |
| 2015/0155589 A1 | 6/2015 | Suh et al. | |
| 2015/0364789 A1 | 12/2015 | Ogawa et al. | |
| 2015/0364790 A1 | 12/2015 | Yonehara et al. | |
| 2017/0200981 A1 | 7/2017 | Yokoyama et al. | |

FOREIGN PATENT DOCUMENTS

| | | |
|---|---|---|
| JP | 2014-167910 A1 | 9/2014 |
| JP | 2015-109260 A1 | 6/2015 |
| JP | 2016-072207 A1 | 5/2016 |
| WO | 2013/118561 A1 | 8/2013 |
| WO | 2014/119665 A1 | 8/2014 |

OTHER PUBLICATIONS

Extended European Search Report (Application No. 16811525.1) dated Dec. 11, 2018.
Chinese Office Action (with English translation), Chinese Application No. 201680033185.3, dated Jul. 31, 2019 (16 pages).

* cited by examiner

NICKEL-ZINC BATTERY CELL PACK AND BATTERY PACK USING SAME

CROSS-REFERENCE TO RELATED APPLICATIONS

This application is a continuation application of PCT/JP2016/067120 filed Jun. 8, 2016, which claims priority to Japanese Patent Application No. 2015-120260 filed Jun. 15, 2015, the entire contents all of which are incorporated herein by reference.

BACKGROUND OF THE INVENTION

1. Field of the Invention

The present invention relates to nickel-zinc cell pack and assembled battery including the nickel-zinc cell pack.

2. Description of the Related Art

Zinc secondary batteries, such as nickel-zinc secondary batteries, have been developed and studied over many years. Unfortunately, these batteries have not yet been put into practice. This is due to a problem that zinc contained in the negative electrode forms dendritic crystals, i.e. dendrites, during a charge mode of the battery and the dendrites break the separator to cause short circuit between the negative electrode and the positive electrode. Thus, a strong demand has arisen for a technique for preventing the short circuit caused by dendritic zinc in zinc secondary batteries, such as nickel-zinc secondary batteries.

In order to meet such a demand, batteries including hydroxide-ion-conductive ceramic separators have been proposed. For example, Patent Document 1 (WO2013/118561) discloses a nickel-zinc secondary battery including a separator composed of a hydroxide-ion-conductive inorganic solid electrolyte between a positive electrode and a negative electrode for preventing the short circuit caused by dendritic zinc, wherein the inorganic solid electrolyte is a layered double hydroxide (LDH) having a basic composition represented by the formula: $M^{2+}_{1-x}M^{3+}_x(OH)_2A^{n-}_{x/n} \cdot mH_2O$ (wherein $M^{2+}$ represents at least one type of divalent cation, $M^{3+}$ represents at least one type of trivalent cation, $A^{n-}$ represents an n-valent anion, n is an integer of 1 or more, and x is 0.1 to 0.4).

An assembled battery composed of a plurality of unit cells is widely known for achieving output of high voltage and high current. An assembled battery has a structure of a laminate composed of a plurality of unit cells connected in series or parallel and disposed in a single battery container.

CITATION LIST

Patent Documents

Patent Document 1: WO2013/118561

SUMMARY OF THE INVENTION

The present applicant has already successfully developed a highly-densified ceramic separator (inorganic solid electrolyte separator) exhibiting hydroxide ion conductivity and yet water impermeability. The present applicant has also successfully formed such a ceramic separator on a porous substrate (e.g., an alumina porous substrate). The use of such a separator (or a separator provided with a porous substrate) in a secondary battery, such as a zinc-nickel battery, can prevent the short circuit caused by dendritic zinc. The maximization of such an effect requires reliable separation of the positive electrode side from the negative electrode side by a hydroxide-ion-conductive ceramic separator in a battery container. If an assembled battery having such a configuration could be readily assembled from a plurality of unit cells, high voltage and high current could be readily achieved, which is very advantageous.

The inventors have recently found that a flexible film can be substituted for rigid materials to form a battery container, for example, to provide unit cells for a nickel-zinc battery in the form of a cell pack having positive and negative electrodes reliably separated by hydroxide ion-conductive separators, which can be readily handled and is very advantageous for forming an assembled battery.

An object of the invention is to provide unit cells for a nickel-zinc battery in the form of a cell pack having a positive and negative electrodes reliably separated by hydroxide ion-conductive separators, which can be readily handled and is very advantageous for forming an assembled battery.

An aspect of the present invention provides a nickel-zinc cell pack including:
  a flexible bag comprising a flexible film;
  a separation sheet liquid-tightly connected to the interior of the flexible bag to separate a positive-electrode chamber and a negative-electrode chamber for inhibiting liquid communication therebetween;
  a positive electrode comprising nickel hydroxide and/or nickel oxyhydroxide and disposed in the positive-electrode chamber;
  a positive-electrode electrolytic solution comprising alkali metal hydroxide and disposed in the positive-electrode chamber, the positive electrode being immersed in the positive-electrode electrolytic solution;
  a negative electrode comprising zinc and/or zinc oxide and disposed in the negative-electrode chamber; and
  a negative-electrode electrolytic solution comprising alkali metal hydroxide and disposed in the negative-electrode chamber, the negative electrode being immersed in the negative-electrode electrolytic solution,
  wherein the separation sheet comprises a separator structure comprising a separator exhibiting hydroxide-ion conductivity and water impermeability.

Another aspect of the present invention provides an assembled battery comprising a battery container and a plurality of nickel-zinc cell packs disposed in the battery container, each pack according to the above embodiment.

DETAILED DESCRIPTION OF THE INVENTION

Nickel-Zinc Cell Pack

Figure 1A:
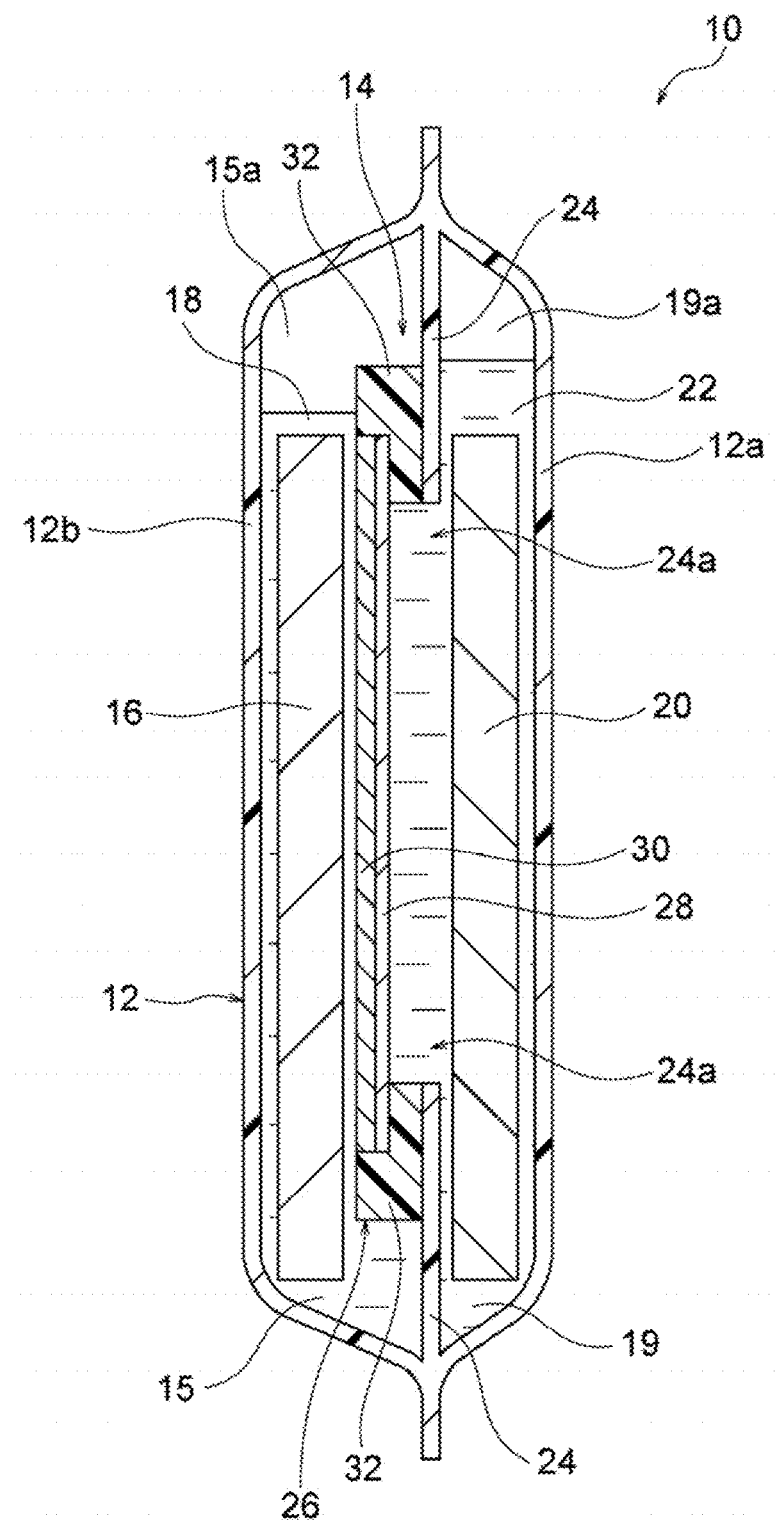
FIG. 1A is a schematic view of an exemplary nickel-zinc cell pack of the invention.

The present invention relates to a nickel-zinc cell pack. As used herein, the term "nickel-zinc cell pack" refers to a package including a unit cell for a nickel-zinc battery (preferably nickel-zinc secondary battery) where the packaging material forming the package is flexible. FIG. 1A is a schematic view of an exemplary nickel-zinc cell pack of the invention. The nickel-zinc cell pack 10 of FIG. 1A has a flexible bag 12, a separation sheet 14, a positive electrode 16, a positive-electrode electrolytic solution 18, a negative electrode 20, and a negative-electrode electrolytic solution 22. The flexible bag 12 is composed of flexible films 12a and 12b. The separation sheet 14 is liquid-tightly connected to the interior of the flexible bag 12 to separate a positive-electrode chamber 15 and a negative-electrode chamber 19 for inhibiting liquid communication therebetween. The positive electrode 16 contains nickel hydroxide and/or nickel oxyhydroxide, and is disposed in the positive-electrode chamber 15. The positive-electrode electrolytic solution 18 contains alkali metal hydroxide, and is contained in the positive-electrode chamber 15 such that the positive electrode 16 is immersed in the positive-electrode electrolytic solution 18. The negative electrode 20 contains zinc and/or zinc oxide, and is disposed in the negative-electrode chamber 19. The negative-electrode electrolytic solution 22 contains alkali metal hydroxide, and is contained in the negative-electrode chamber 19 such that the negative electrode 20 is immersed in the negative-electrode electrolytic solution 22. The separation sheet 14 has a separator structure 26 including a separator 28 exhibiting hydroxide-ion conductivity and water impermeability. The separation sheet 14 preferably may further includes a flexible film 24 having an opening 24a, and the separator structure 26 liquid-tightly seals the opening 24a. It should be appreciated that the positive electrode 16 and the negative electrode 20 are each connected to a collector, and a lead and/or terminal, although not shown in FIG. 1A for easier drawing, to extract electromotive force from the cell pack 10.

Figure 1B:
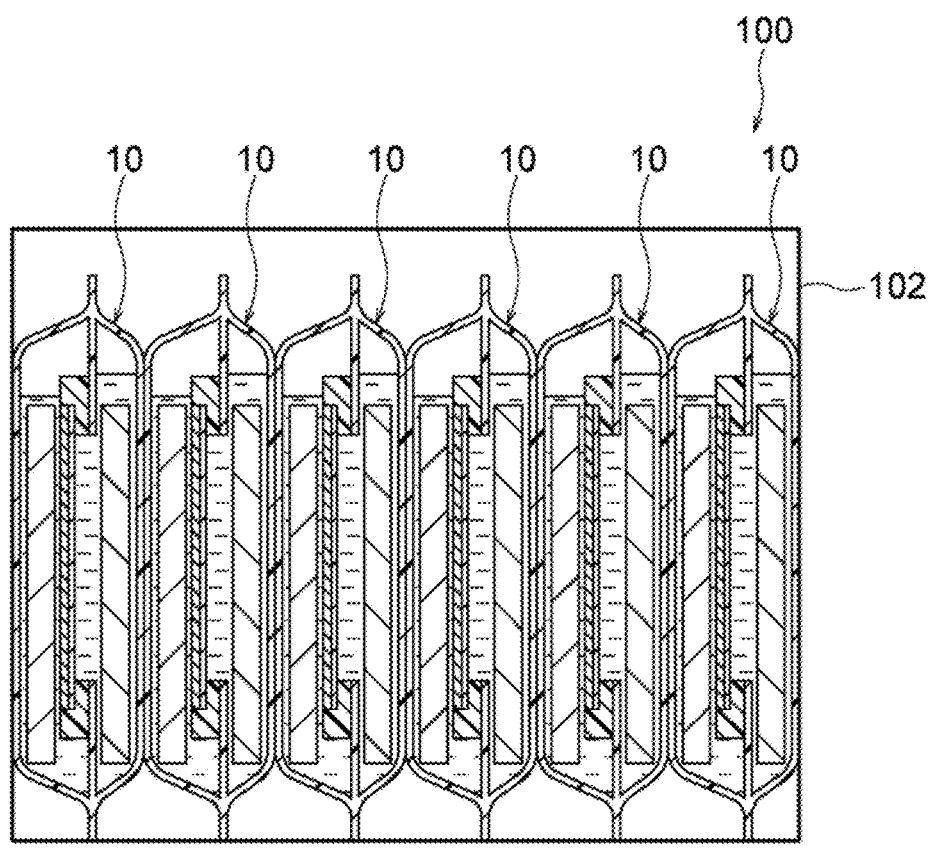
FIG. 1B is a schematic view of an exemplary arrangement of a plurality of nickel-zinc cell packs in an assembled battery of the invention.

According to the invention, flexible films are substituted for rigid materials to form a battery container, for example, to provide a unit cell for a nickel-zinc battery in the form of a cell pack having positive and negative electrodes reliably separated by a hydroxide ion-conductive separator, which can be readily handled and is very advantageous for forming an assembled battery. More specifically, the nickel-zinc cell pack 10 is portable without liquid leakage and thus can be readily handled, because of the space-saving arrangement of the separation sheet 14 (including the separator structure 26), the positive electrode 16, the positive-electrode electrolytic solution 18, the negative electrode 20, and the negative-electrode electrolytic solution 22 in the flexible bag 12. Furthermore, the nickel-zinc cell pack 10 generally has a very flexible form because the electrolytic solutions are contained in the flexible bag 12 composed of the flexible films 12a and 12b. More specifically, although the positive electrode 16, the negative electrode 20, and the separator structure 26 have no or less flexibility, the flexibility of the flexible films 12a and 12b in combination with the fluidity of the electrolytic solutions provides the total cell pack 10 with sufficient flexibility that is advantageous for producing an assembled battery. In particular, an assembled battery including unit cells composed of rigid materials often causes a problem on dimensional tolerance between unit cells and a battery container for an assembled battery to contain these unit cells. More specifically, high dimensional accuracy is required, otherwise unit cells cannot be successfully disposed in a battery container when they are assembled into an assembled battery. For example, if unit cells are tightly packed in a battery container, an excess stress may be generated. If they are loosely packed in a battery container, they may waste the space. In particular, an excess stress applied to unit cells may result in adverse effects on battery performance. In this regard, the nickel-zinc cell pack 10 of the invention is generally flexible, and thus a plurality of, preferably as many as possible, cell packs 10 can be readily packed in the battery container 102 for the assembled battery 100 as schematically shown in FIG. 1B, without strict design requirements such as dimensional tolerance. More specifically, since each cell pack 10 sufficiently meets required functions for unit cells of a nickel-zinc battery, an assembled battery with desired performance can be readily produced only by packing a plurality of cell packs 10 in a battery container for an assembled battery in a relatively rough manner and connecting them together in series or in parallel; even if the cell packs 10 are packed in a relatively rough manner, their flexibility (and fluidity of electrolytic solutions contained therein) facilitates dispersion of the stress applied to the cell packs, ensuring structural stability and performance stability of the resulting assembled battery and the unit cells in the assembled battery. Furthermore, since each cell pack 10 has the positive electrode 16 and the negative electrode 20 reliably separated by the separation sheet 14 including the separator 28 with hydroxide ion conductivity and water impermeability, the separator 28 blocks dendritic zinc which grows from the negative electrode 20 toward the positive electrode 16 during charge and discharge of the battery, to effectively prevent the short circuit between the positive and negative electrodes due to the dendritic zinc.

Flexible Bag

The flexible bag 12 is a bag-shaped flexible package composed of flexible films. The flexible films of the flexible bag 12 preferably include resin films. Preferably, the resin films are resistant to alkali metal hydroxide, such as potassium hydroxide, and can be bonded by thermal bonding. Examples of such resin films include polypropylene (PP), poly(ethylene terephthalate) (PET), and poly(vinyl chloride) (PVC) films. Flexible films such as resin films include commercially available laminate films, preferably thermal laminate films composed of two or more layers including a base film (e.g., PET or PP film) and a thermoplastic resin layer. The flexible films (e.g., laminated films) preferably have a thickness of 20 to 500 µm, more preferably 30 to 300 µm, even more preferably 50 to 150 µm. As shown in FIG. 1A, the flexible bag 12 is preferably composed of a pair of flexible films 12a and 12b sealed by thermal bonding at their outer peripheries except for at least the upper edge, whereby the positive-electrode electrolytic solution 18 and the negative-electrode electrolytic solution 22 are reliably retained in the flexible bag 12 without liquid leakage. More preferably, the upper edges of the flexible bag 12 are also sealed by thermal bonding, such that the liquid tightness of the total cell pack 10 is ensured. In such a case, electrolytic solutions are injected in the flexible bag 12 and then the upper edges of the flexible bag 12 are sealed by thermal bonding. The bonding or sealing by thermal bonding may be performed with a commercially available heat sealer, for example.

Separation Sheet

The separation sheet 14 is a substantially sheet-shaped material liquid-tightly connected to the interior of the flexible bag 12 to separate the positive-electrode chamber 15 and the negative-electrode chamber 19 for inhibiting liquid communication therebetween. The separation sheet 14 includes a separator structure 26. The separator structure 26 includes a separator 28 exhibiting hydroxide ion conductivity and water impermeability. Such configuration permits hydroxide ion conduction but not liquid communication between the positive-electrode chamber 15 and the negative-electrode chamber 19. Preferably, the separation sheet 14 may further include a flexible film 24 with an opening 24a which is liquid-tightly sealed by the separator structure 26. Since the separation sheet 14 also includes the flexible film 24, the cell pack 10 generally has more flexibility. More specifically, the flexibility of the flexible films 12a, 24, and 12b in combination with the fluidity of the electrolytic solutions provides the total cell pack 10 with sufficient flexibility that is more advantageous for producing an assembled battery. The flexible film 24 of the separation sheet 14 preferably includes a resin film. Preferably, the resin film is resistant to alkali metal hydroxide such as potassium hydroxide and can be bonded by thermal bonding. Examples of such a resin film include polypropylene (PP), poly(ethylene terephthalate) (PET), and poly(vinyl chloride) (PVC) films. Examples of the flexible film including a resin film include commercially available laminate films, preferably thermal laminate films composed of two or more layers including a base film (e.g., PET or PP film) and a thermoplastic resin layer. The flexible film 24 (e.g., a laminated film) preferably has a thickness of 20 to 500 µm, more preferably 30 to 300 µm, even more preferably 50 to 150 µm. The bonding or sealing by thermal bonding may be performed with a commercially available heat sealer, for example.

As described above, the flexible bag 12 is composed of a pair of flexible films 12a and 12b, and is preferably formed by sealing them by thermal bonding at their outer peripheries except for at least the upper edge. In such a case, the flexible film 24 of the separation sheet 14 is bonded together with and between the pair of flexible films 12a and 12b by thermal bonding at their outer peripheries except for at least the upper edge. More preferably, the flexible film 24 of the separation sheet 14 is bonded together with and between the pair of flexible films 12a and 12b by thermal bonding along their substantially entire outer peripheries, including or not including the upper edge.

The separator structure 26 preferably includes a frame 32 along the outer periphery of the separator 28. If the separation sheet 14 includes a flexible film 24, the flexible film 24 of the separation sheet 14 is preferably bonded liquid-tightly to the separator structure 26 with the frame 32 disposed therebetween. The frame 32 is preferably a resin frame, and is more preferably bonded to the flexible film 24 of the separation sheet 14 with an adhesive or by thermal bonding. Epoxy-resin adhesives are preferred in view of its especially high alkali resistance. Hot-melt adhesives may also be used. In any case, it is desirable to keep liquid tightness at the joint portion of the flexible film 24 with the frame 32. The resin of the frame 32 preferably has resistance to alkali metal hydroxide such as potassium hydroxide, and is more preferably a polyolefin resin, ABS resin, PP resin, PE resin, or modified polyphenylene ether, yet more preferably an ABS resin, PP resin, PE resin, or modified polyphenylene ether.

The separator 28 exhibits hydroxide ion conductivity and water impermeability, and is typically in a plate, membrane, or layer form. As used herein, the term "water impermeability" indicates that water in contact with one surface of an analyte (e.g., the LDH membrane and/or the porous substrate) does not reach the other surface during the "density evaluation test I" performed in Example 1 described below or any other equivalent method or system. The water impermeability of the separator 28 indicates that the separator 28 has a density sufficiently high to prevent the permeation of water and is not a porous film or any other porous material having water permeability. Thus, this configuration is very effective for physically inhibiting the penetration of dendritic zinc (which may be formed during a charge mode of the battery) through the separator, to prevent the short circuit between the positive and negative electrodes. It should be understood that the separator 28 may be provided with a porous substrate 30, as shown in FIG. 1A. In any case, the hydroxide ion conductivity of the separator 28 leads to efficient migration of hydroxide ions between the positive-electrode electrolytic solution 18 and the negative-electrode electrolytic solution 22, resulting in charge/discharge reaction in the positive-electrode chamber 15 and the negative-electrode chamber 19. The following reactions occur at the positive-electrode chamber 15 and the negative-electrode chamber 19 during a charge mode of the battery (reverse reactions occur during a discharge mode).

Positive electrode: 
$$Ni(OH)_2 + OH^- \rightarrow NiOOH + H_2O + e^-$$

Negative electrode: 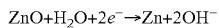
$$ZnO + H_2O + 2e^- \rightarrow Zn + 2OH^-$$

The aforementioned reaction at the negative electrode involves the following two reactions:

    Dissolution of ZnO:

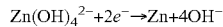    Precipitation of Zn:

The separator 28 preferably comprises an inorganic solid electrolyte. The use of the separator 28 comprising a hydroxide-ion-conductive inorganic solid electrolyte separates the electrolytic solutions between the positive and negative electrodes, and ensures conduction of hydroxide ions. The inorganic solid electrolyte of the separator 28 is typically a dense and hard inorganic solid electrolyte, and thus can physically inhibit the penetration of dendritic zinc (which may be formed during a charge mode of the battery) through the separator, to prevent the short circuit between the positive and negative electrodes, resulting in significantly improved reliability of the nickel-zinc battery. The inorganic solid electrolyte is desirably densified to exhibit water impermeability. For example, the inorganic solid electrolyte has a relative density of preferably 90% or more, more preferably 92% or more, still more preferably 95% or more, as determined by the Archimedes method. The density may be any value so long as the inorganic solid electrolyte is dense and hard enough to prevent the penetration of dendritic zinc. Such a dense and hard inorganic solid electrolyte may be produced through hydrothermal treatment. Thus, a green compact which has not undergone hydrothermal treatment is not suitable as the inorganic solid electrolyte in the present invention because the compact is not dense and is brittle in the solution. Any process other than hydrothermal treatment may also be used for producing a dense and hard inorganic solid electrolyte.

The separator 28 or the inorganic solid electrolyte may be in the form of a composite body containing particles of an inorganic solid electrolyte exhibiting hydroxide ion conductivity and an auxiliary component that promotes the densification or hardening of the particles. Alternatively, the separator 28 may be in the form of a composite body containing a porous body serving as a substrate and an inorganic solid electrolyte (e.g., a layered double hydroxide) that is precipitated and grown in pores of the porous body to fill the pores. Examples of the materials of the porous body include ceramic materials, such as alumina and zirconia; and insulating materials, such as porous sheets composed of foamed resin or fibrous material.

The inorganic solid electrolyte preferably contains a layered double hydroxide (LDH), and is more preferably composed of such an LDH. Typically, LDH has a basic composition represented by the formula: $M^{2+}_{1-x}M^{3+}_{x}(OH)_2A^{n-}_{x/n} \cdot mH_2O$ (wherein $M^{2+}$ represents a divalent cation, $M^{3+}$ represents a trivalent cation, $A^{n-}$ represents an n-valent anion, n is an integer of 1 or more, x is 0.1 to 0.4, and m is 0 or more). In the formula, $M^{2+}$ may represent any divalent cation, and is preferably $Mg^{2+}$, $Ca^{2+}$ or $Zn^{2+}$, more preferably $Mg^{2+}$. $M^{3+}$ may represent any trivalent cation, and is preferably $Al^{3+}$ or $Cr^{3+}$, more preferably $Al^{3+}$. $A^{n-}$ may represent any anion, and is preferably $OH^-$ or $CO_3^{2-}$. In the formula, preferably, $M^{2+}$ comprises $Mg^{2+}$, $M^{3+}$ comprises $Al^{3+}$, and $A^{n-}$ comprises $OH^-$ and/or $CO_3^{2-}$. In the formula, n is an integer of 1 or more, preferably 1 or 2; x is 0.1 to 0.4, preferably 0.2 to 0.35; and m is any number indicating the molar number of water, being 0 or more, typically a real or integer number exceeding 0 or not less than 1. In the formula, $M^{3+}$ may be partially or entirely replaced with a cation having a valency of 4 or more. In such a case, the coefficient x/n of the anion $A^{n-}$ in the formula may be appropriately varied.

The inorganic solid electrolyte is preferably densified through hydrothermal treatment. The hydrothermal treatment is very effective for the densification of a layered double hydroxide, in particular, an Mg—Al layered double hydroxide. The densification by the hydrothermal treatment involves, for example, a process described in Patent Document 1 (WO2013/118561), in which pure water and a green compact plate are treated in a pressure container at a temperature of 120 to 250° C., preferably 180 to 250° C. for 2 to 24 hours, preferably 3 to 10 hours. A more preferred process involving the hydrothermal treatment will be described below.

The inorganic solid electrolyte may be in a plate, membrane, or layer form. The inorganic solid electrolyte in a membrane or layer form is preferably disposed on or in the porous substrate. The inorganic solid electrolyte in the form of a plate has a sufficient hardness and more effectively prevents the penetration of dendritic zinc. The inorganic solid electrolyte in a membrane or layer form having a thickness smaller than that of the plate is advantageous in that the electrolyte has a minimum hardness required for preventing the penetration of dendritic zinc and significantly reduces the resistance of the separator. The inorganic solid electrolyte in the form of a plate has a thickness of preferably 0.01 to 0.5 mm, more preferably 0.02 to 0.2 mm, still more preferably 0.05 to 0.1 mm. The inorganic solid electrolyte preferably exhibits a high hydroxide ion conductivity. The inorganic solid electrolyte typically exhibits a hydroxide ion conductivity of $10^{-4}$ to $10^{-1}$ S/m. The inorganic solid electrolyte in a membrane or layer form has a thickness of preferably 100 μm or less, more preferably 75 m or less, still more preferably 50 μm or less, particularly preferably m or less, most preferably 5 m or less. Such a small thickness achieves a reduction in resistance of the separator 28. The lower limit of the thickness may vary depending on the intended use of the inorganic solid electrolyte. The thickness is preferably 1 m or more, more preferably 2 μm or more, in order to secure a hardness required for a separator membrane or layer.

A porous substrate 30 may be disposed on either or both of the surfaces of the separator 28. In other words, the separator structure 26 may further include a porous substrate 30 on either or both of the surfaces of the separator 28. When the porous substrate 30 is disposed on one surface of the separator 28, the porous substrate 30 may be disposed on a surface, adjacent to the negative electrode 20, of the separator 28 or on a surface, adjacent to the positive electrode 16, of the separator 28. The porous substrate 30 has water permeability, and thus the positive-electrode electrolytic solution 18 and the negative-electrode electrolytic solution 22 permeate the substrate and reach the separator. The presence of the porous substrate 30 leads to more reliable retention of hydroxide ions on the separator 28. The strength imparted by the porous substrate 30 can reduce the thickness of the separator 28, resulting in a reduction in resistance. A dense membrane or layer of the inorganic solid electrolyte (preferably LDH) may be formed on or in the porous substrate 30. The disposition of the porous substrate on one surface of the separator 28 probably involves a process including preparation of the porous substrate 30 and formation of a membrane of the inorganic solid electrolyte on the porous substrate (this process will be described below). In contrast, the disposition of the porous substrate on the two surfaces of the separator 28 probably involves a process including densification of the raw powder of the inorganic solid electrolyte disposed between two porous substrates. With reference to FIG. 1A, the porous substrate 30 is disposed entirely on one surface of the separator 28. Alternatively, the porous substrate 30 may be disposed only on a portion (e.g., a region responsible for charge/discharge reaction) of one surface of the separator 28. For example, the formation of a membrane or layer of the inorganic solid electrolyte on or in the porous substrate 30 typically leads to the process-derived structure; i.e., the porous substrate 30 is disposed entirely on one surface of the separator 28. In contrast, the formation of an independent plate of the inorganic solid electrolyte (having no substrate) may involve the subsequent step of disposing the porous substrate 30 on a portion (e.g., a region responsible for charge/discharge reaction) or the entirety of one surface of the separator 28.

If the separator structure 26 has the porous substrate 30 on one side of the separator 28, the separator 28 may be disposed on a side, adjacent to the positive electrode 16 or negative electrode 20, of the porous substrate 30. The separator 28 is preferably disposed on a side, adjacent to the negative electrode 20, of the porous substrate 30. Such configuration can more effectively prevent detachment of the separator 28 (e.g., an LDH dense membrane) from the porous substrate 30. More specifically, when the dendritic zinc generated on the negative electrode 20 grows and reaches the separator 28, the stress which may be produced during the growth of dendritic zinc acts in a direction to press the separator 28 toward the porous substrate 30, preventing easy detachment of the separator 28 from the porous substrate 30.

Figure 17:
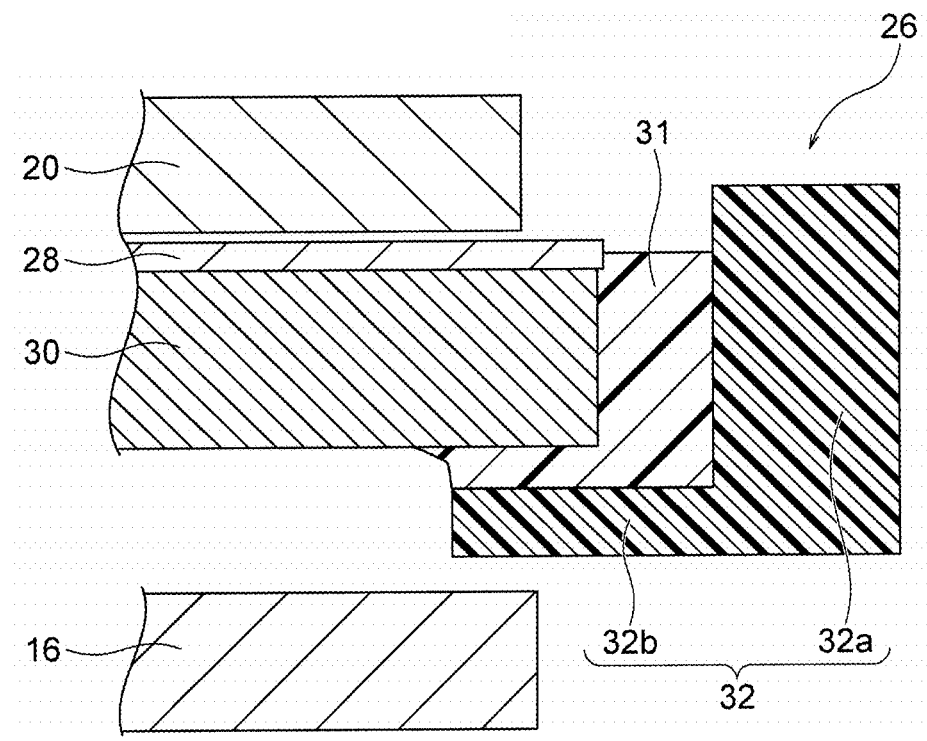
FIG. 17 is a schematic cross-sectional view illustrating an exemplary arrangement of a separator, a porous substrate, and a frame.

As described above, the separator structure 26 preferably has the frame 32 along the outer periphery of the separator 28, and the frame 32 is more preferably a resin frame. FIG. 17 shows a preferred embodiment of the separator structure 26 including the frame 32, wherein the separator 28 is disposed on a side, adjacent to the negative electrode 20, of the porous substrate 30 (i.e. the porous substrate 30 is disposed on a side, adjacent to the positive electrode 16, of the separator 28). The frame 32 in the embodiment shown in FIG. 17 includes an outer frame 32a having an opening capable of accommodating the separator 28 and the porous substrate 30; and an inner frame 32b extending from the end and/or a portion near the end, adjacent to the positive electrode 16, of the outer frame 32a toward the opening. The inner frame 32b engages with a side, adjacent to the positive electrode 16, of the porous substrate 30. Preferably, the joint portion of the frame 32 (i.e. the outer frame 32a and the inner frame 32b) with the porous substrate 30, or with both the porous substrate 30 and the separator 28, is liquid-tightly sealed with an adhesive 31. With such configuration, when the dendritic zinc generated on the negative electrode 20 grows and reaches the separator 28, the stress which may be produced during the growth of dendritic zinc acts in a direction to press the porous substrate 30 toward the inner frame 32b, resulting in compression of the adhesive 31 between the porous substrate 30 and the inner frame 32b to enhance the liquid-tight sealing and bonding with the adhesive 31. More specifically, even if the stress produced by the dendritic zinc is applied, the configuration allows the stress to act in a direction to compress, not to pull, the adhesive 31 from the two sides, which effectively prevents the detachment of the frame 32 caused by pulling of the adhesive 31 from the two sides. It should be appreciated that the frame 32 including the outer frame 32a and the inner frame 32b may also be employed in an embodiment with the separator 28 disposed on a side, adjacent to the positive electrode 16, of the porous substrate 30.

As described above, a second separator (resin separator) composed of a hygroscopic resin or a liquid-retaining resin (e.g., non-woven fabric) may be disposed between the positive electrode 16 and the separator 28 and/or between the negative electrode 20 and the separator 28 such that the electrolytic solution can be retained in a reaction portion of the positive electrode and/or the negative electrode despite a reduction in amount of the electrolytic solution. Preferred examples of the hygroscopic resin or the liquid-retaining resin include polyolefin resins.

Positive Electrode

The positive electrode 16 contains nickel hydroxide and/or nickel oxyhydroxide. The nickel-zinc battery in a discharge end state may involve the use of nickel hydroxide in the positive electrode 16. The nickel-zinc battery in a full charge state may involve the use of nickel oxyhydroxide in the positive electrode 16. Nickel hydroxide or nickel oxyhydroxide is a common positive-electrode active material used in nickel-zinc batteries and is typically in a particulate form. Nickel hydroxide or nickel oxyhydroxide may form a solid solution in the crystal lattice with an element other than nickel for an improvement in charge efficiency at high temperature. Examples of the element include zinc and cobalt. Nickel hydroxide or nickel oxyhydroxide may be mixed with a cobalt component. Examples of the cobalt component include particulate metallic cobalt and particulate cobalt oxide (e.g., cobalt monoxide). Particulate nickel hydroxide or nickel oxyhydroxide (which may form a solid solution with an element other than nickel) may be coated with a cobalt compound. Examples of the cobalt compound include cobalt monoxide, α-cobalt (II) hydroxide, β-cobalt (II) hydroxide, cobalt compounds having a valency of more than 2, and any combination thereof.

The positive electrode 16 may contain an additional element besides the nickel hydroxide compound and the element that may form a solid solution with the compound. Examples of the additional element include scandium (Sc), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), lutetium (Lu), hafnium (Hf), tantalum (Ta), tungsten (W), rhenium (Re), osmium (Os), iridium (Ir), platinum (Pt), gold (Au), mercury (Hg), and any combination thereof. Such an additional element may be contained in any form, such as elemental metal or a metal compound (e.g., oxide, hydroxide, halide, or carbonate). The amount of the additional element (in the form of elemental metal or metal compound) is preferably 0.5 to 20 parts by weight, more preferably 2 to 5 parts by weight, relative to 100 parts by weight of the nickel hydroxide compound.

The positive electrode 16 may be combined with the electrolytic solution to form a positive-electrode mixture. The positive-electrode mixture may contain the particulate nickel hydroxide compound, the electrolytic solution, and optionally an electrically conductive material (e.g., particulate carbon) or a binder.

Negative Electrode

The negative electrode 20 contains zinc and/or zinc oxide. Zinc may be contained in any form exhibiting electrochemical activity suitable for the negative electrode; for example, in the form of metallic zinc, a zinc compound, or a zinc alloy. Preferred examples of the negative electrode material include zinc oxide, metallic zinc, and calcium zincate. More preferred is a mixture of metallic zinc and zinc oxide. The negative electrode 20 may be in the form of gel, or may be combined with the electrolytic solution to form a negative-electrode mixture. For example, the negative electrode in the form of gel may be readily prepared through addition of the electrolytic solution and a thickener to the negative-electrode active material. Examples of the thickener include poly(vinyl alcohol), poly(acrylic acid) salts, CMC, and alginic acid. Preferred is poly(acrylic acid), which exhibits high resistance to a strong alkali.

The zinc alloy may be a non-amalgamated zinc alloy; i.e., a zinc alloy not containing mercury or lead. For example, a zinc alloy containing 0.01 to 0.06 mass % indium, 0.005 to 0.02 mass % bismuth, and 0.0035 to 0.015 mass % aluminum is preferred because of the effect of reducing the generation of hydrogen gas. In particular, indium and bismuth are advantageous in improving discharge performance. The use of a zinc alloy in the negative electrode retards the self-dissolution in the alkaline electrolytic solution, to reduce the generation of hydrogen gas, resulting in improved safety.

The negative electrode material may be in any form, but is preferably in a powdery form.

The powdery negative electrode material has a large surface area and is adapted to large current discharge. The negative electrode material (in the case of a zinc alloy) preferably has a mean particle size of 90 to 210 m. The negative electrode material having such a mean particle size has a large surface area and thus is adapted to large current discharge.

In addition, the negative electrode material can be evenly mixed with the electrolytic solution or a gelling agent, and is readily handled during the assembly of the battery.

Collector

The nickel-zinc cell pack 10 preferably further includes a positive-electrode collector (not shown) disposed in contact with the positive electrode 16 and a negative-electrode collector (not shown) disposed in contact with the negative electrode 20. In such a case, the positive-electrode collector and the negative-electrode collector preferably extend from different positions of the outer periphery of the flexible bag 12. Alternatively, the positive-electrode collector and the negative-electrode collector may be respectively configured such that the positive electrode 16 and the negative electrode 20 are respectively connected to a separately provided positive-electrode terminal and a separately provided negative-electrode terminal inside or outside of the flexible bag 12. Preferred examples of the positive-electrode collector include nickel porous substrates, such as foamed nickel plates. In such a case, a paste containing an electrode active material (e.g., nickel hydroxide) may be evenly applied onto a nickel porous substrate and then dried, to prepare a positive-electrode plate composed of the positive electrode on the positive-electrode collector. After the drying step, the positive-electrode plate (i.e., the positive electrode on the positive-electrode collector) is preferably subjected to pressing for prevention of detachment of the electrode active material or an improvement in electrode density. Preferred examples of the negative-electrode collector include punched copper sheets. In such a case, a mixture containing zinc oxide powder and/or zinc powder and an optional binder (e.g., particulate polytetrafluoroethylene) may be applied onto a punched copper sheet to prepare a negative-electrode plate composed of the negative electrode on the negative-electrode collector. After the drying of the mixture, the negative-electrode plate (i.e., the negative electrode on the negative-electrode collector) is preferably subjected to pressing for prevention of detachment of the electrode active material or an improvement in electrode density.

Electrolytic Solution

Each of the positive-electrode electrolytic solution 18 and the negative-electrode electrolytic solution 22 contains an alkali metal hydroxide. In other words, an aqueous solution containing an alkali metal hydroxide is used as the positive-electrode electrolytic solution 18 and the negative-electrode electrolytic solution 22. Examples of the alkali metal hydroxide include potassium hydroxide, sodium hydroxide, lithium hydroxide, and ammonium hydroxide. More preferred is potassium hydroxide. The electrolytic solution may contain a zinc compound, such as zinc oxide or zinc hydroxide, for preventing the self-dissolution of a zinc alloy. As described above, the positive-electrode electrolytic solution 18 and the negative-electrode electrolytic solution 22 may be in the form of a positive-electrode mixture and/or a negative-electrode mixture prepared through combination with the positive electrode 16 and/or the negative electrode 20. Alternatively, the electrolytic solution may be formed into a gel for preventing the leakage of the solution. The gelling agent is preferably a polymer that swells through absorption of the solvent of the electrolytic solution. Examples of the gelling agent include polymers, such as poly(ethylene oxide), poly(vinyl alcohol), and polyacrylamide; and starch.

The nickel-zinc cell pack 10 preferably has an extra positive-electrode space 15a in the positive-electrode chamber 15. The extra positive-electrode space 15a has a volume that meets a variation in amount of water in association with the reaction at the positive electrode during charge/discharge of the battery. Also, the nickel-zinc cell pack 10 preferably has an extra negative-electrode space 19a in the negative-electrode chamber 19. The extra negative-electrode space 19a has a volume that meets a variation in amount of water in association with the reaction at the negative electrode during charge/discharge of the battery. This configuration effectively prevents problems caused by a variation in amount of water in the positive-electrode chamber 15 and the negative-electrode chamber 19 (e.g., liquid leakage and deformation of the container due to a variation in internal pressure of the container), resulting in further improved reliability of the nickel-zinc battery. As indicated by the aforementioned reaction formulae, the amount of water increases in the positive-electrode chamber 15 and decreases in the negative-electrode chamber 19 during a charge mode, whereas the amount of water decreases in the positive-electrode chamber 15 and increases in the negative-electrode chamber 19 during a discharge mode. Most traditional separators exhibit water permeability and thus allow water to pass therethrough freely. In contrast, the separator 28 used in the present invention has high density and water impermeability. Hence, water cannot pass through the separator 28 freely, and an increase in amount of the electrolytic solution in the positive-electrode chamber 15 and/or the negative-electrode chamber 19 during charge/discharge of the battery may cause problems, such as liquid leakage. The positive-electrode chamber 15 has the extra positive-electrode space 15a having a volume that meets a variation in amount of water in association with the reaction at the positive electrode during charge/discharge of the battery, and thus the extra positive-electrode space 15a can buffer an increase in amount of the positive-electrode electrolytic solution 18 during a charge mode. Since the extra positive-electrode space 15a serves as a buffer even after full charge, an increased amount of the positive-electrode electrolytic solution 18 can be reliably retained in the positive-electrode chamber 15 without causing overflow of the electrolytic solution. Similarly, the negative-electrode chamber 19 has the extra negative-electrode space 19a having a volume that meets a variation in amount of water in association with the reaction at the negative electrode during charge/discharge of the battery, and thus the extra negative-electrode space 19a can buffer an increase in amount of the negative-electrode electrolytic solution 22 during a discharge mode.

A variation in amount of water in the positive-electrode chamber 15 or the negative-electrode chamber 19 can be determined on the basis of the aforementioned reaction formulae. As indicated by the reaction formulae, the amount of $H_2O$ produced at the positive electrode 16 during a charge mode is twice the amount of $H_2O$ consumed at the negative electrode 20. Thus, the volume of the extra positive-electrode space 15a may be greater than that of the extra negative-electrode space 19a. The volume of the extra positive-electrode space 15a is preferably determined such that the positive-electrode chamber 15 can be adapted to an increased amount of water and gasses (e.g., air originally contained in the positive-electrode chamber 15, and oxygen gas generated from the positive electrode 16 during overcharge) at an appropriate internal pressure. Although the volume of the extra negative-electrode space 19a may be equal to that of the extra positive-electrode space 15a, the volume of the extra negative-electrode space 19a is preferably greater than the amount of water decreased during a charge mode in the case of the battery in a discharge end state. In any case, the volume of the extra negative-electrode space 19a may be smaller than that of the extra positive-electrode space 15a because a variation in amount of water in the negative-electrode chamber 19 is about half that in the positive-electrode chamber 15.

The nickel-zinc cell pack 10 in a discharge end state preferably satisfies the following conditions: the extra positive-electrode space 15a has a volume greater than the amount of water that will increase in association with the reaction at the positive electrode during a charge mode; the extra positive-electrode space 15a is not preliminarily filled with the positive-electrode electrolytic solution 18; the extra negative-electrode space 19a has a volume greater than the amount of water that will decrease in association with the reaction at the negative electrode during the charge mode; and the extra negative-electrode space 19a is preliminarily filled with an amount of the negative-electrode electrolytic solution 22 that will decrease during the charge mode. In contrast, the nickel-zinc cell pack 10 in a full charge state preferably satisfies the following conditions: the extra positive-electrode space 15a has a volume greater than the amount of water that will decrease in association with the reaction at the positive electrode during a discharge mode; the extra positive-electrode space 15a is preliminarily filled with an amount of the positive-electrode electrolytic solution 18 that will decrease during the discharge mode; the extra negative-electrode space 19a has a volume greater than the amount of water that will increase in association with the reaction at the negative electrode during the discharge mode; and the extra negative-electrode space 19a is not preliminarily filled with the negative-electrode electrolytic solution 22.

The nickel-zinc cell pack 10 of the invention preferably has the flexible bag 12, the separation sheet 14, the positive electrode 16, and the negative electrode 20 are disposed vertically. In such a case, the positive-electrode chamber 15 preferably has the extra positive-electrode space 15a in its upper portion and the negative-electrode chamber 19 preferably has the extra negative-electrode space 19a in its upper portion, as shown in FIG. 1A. If gelled electrolytic solutions are used, the positive-electrode chamber 15 and/or the negative-electrode chamber 19 can retain the respective electrolytic solutions in a reaction site during the charge or discharge operation of the battery, regardless of a decrease in electrolytic solutions. Thus, the extra positive-electrode space 15a can be disposed in a portion other than the upper portion (e.g. lateral or lower portion) of the positive-electrode chamber 15, and/or the extra negative-electrode space 19a can be disposed in a portion other than the upper portion (e.g. lateral or lower portion) of the negative-electrode chamber 19, which increases the degree of design freedom.

Assembled Battery

As described above, the nickel-zinc cell pack 10 of the invention generally has high flexibility, and thus a plurality of, preferably as many as possible, cell packs 10 can be readily packed in the battery container 102 for the assembled battery 100 as schematically shown in FIG. 1B, without strict dimensional requirements such as dimensional tolerance. More specifically, a preferred embodiment of the invention provides an assembled battery 100 having a plurality of nickel-zinc cell packs 10 of the invention packed in the battery container 102. It should be appreciated that the positive electrode 16 and the negative electrode 20 of the individual cell packs 10 are each connected to a collector, and a lead and/or terminal, although not shown in FIG. 1B for easier drawing, to extract electromotive force from the individual cell packs 10 in the battery container 102. The nickel-zinc cell packs 10 in the battery container 102 may be connected together in series or in parallel. The nickel-zinc cell packs 10 in the battery container 102 are preferably disposed vertically as shown in FIG. 1B, but may also be disposed horizontally, unless such arrangement causes some problem.

LDH Separator with Porous Substrate

Figure 2:
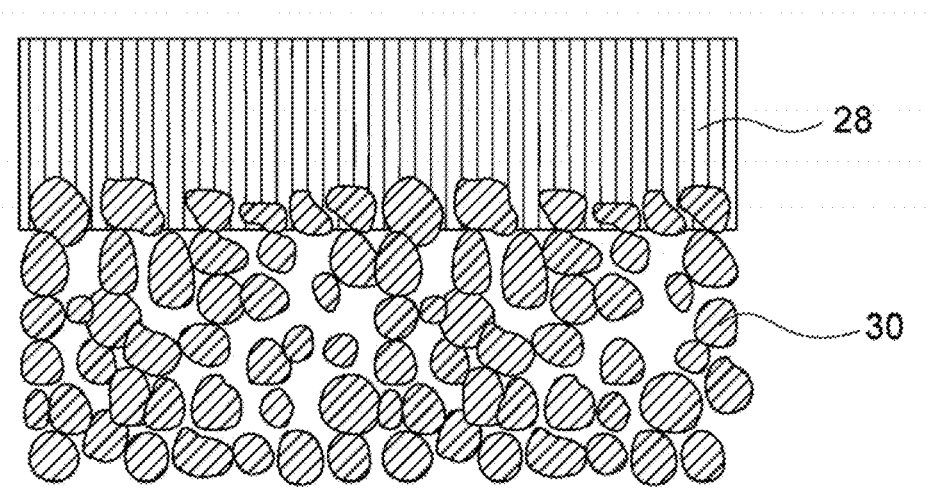
FIG. 2 is a schematic cross-sectional view of a porous substrate-supported separator in an embodiment.
Figure 3:
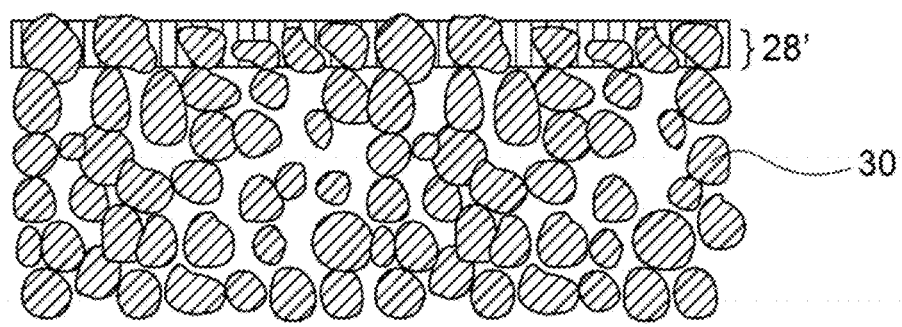
FIG. 3 is a schematic cross-sectional view of a porous substrate-supported separator in another embodiment.

As described above, the porous substrate-supported separator preferably used in the nickel-zinc cell pack of the present invention includes a separator composed of a hydroxide-ion-conductive inorganic solid electrolyte and a porous substrate disposed on at least one surface of the separator. The inorganic solid electrolyte is in the form of a membrane or layer densified enough to have water impermeability. The particularly preferred porous substrate-supported separator includes a porous substrate and a separator layer formed on and/or in the porous substrate. The separator layer contains the aforementioned layered double hydroxide (LDH). The separator layer preferably exhibits water impermeability and gas impermeability. Preferably, the porous substrate exhibits water permeability and gas permeability because of the presence of pores, and the separator layer composed of LDH exhibits high density and thus water impermeability and gas impermeability. The separator layer is preferably formed on the porous substrate. As illustrated in FIG. 2, it is preferred that the separator layer 28 in the form of an LDH dense membrane be formed on the porous substrate 30. In such a case, in view of the characteristics of the porous substrate 30, LDH may be formed in pores in the surface and its vicinity of the porous substrate 30, as illustrated in FIG. 2. Alternatively, as illustrated in FIG. 3, LDH may be densely formed in the porous substrate 30 (e.g., in pores in the surface and its vicinity of the porous substrate 30) such that at least a portion of the porous substrate 30 forms the separator layer 28'. The separator illustrated in FIG. 3 has a structure prepared by removal of a portion corresponding to the membrane of the separator layer 28 of the separator illustrated in FIG. 2. The separator may have any other structure such that the separator layer is disposed parallel to the surface of the porous substrate 30. In any case, the separator layer composed of LDH is highly-densified and thus exhibits water impermeability and gas impermeability. Thus, the separator layer exhibits particular characteristics, i.e. hydroxide ion conductivity, water impermeability, and gas impermeability (i.e., the layer basically allows only hydroxide ions to pass therethrough).

The porous substrate is preferably one on which and/or in which the LDH-containing separator layer can be formed. The porous substrate may be composed of any material and may have any porous structure. In a typical embodiment, the LDH-containing separator layer is formed on and/or in the porous substrate. Alternatively, the LDH-containing separator layer may be formed on a non-porous substrate, and then the non-porous substrate may be modified into a porous form by any known process. In any case, the porous substrate preferably has a water-permeable porous structure because such a porous structure enables an electrolytic solution to come into contact with the separator layer in the case of the use of the layer as a separator for a battery.

The porous substrate is preferably composed of at least one selected from the group consisting of ceramic materials, metal materials, and polymer materials. The porous substrate is more preferably composed of a ceramic material. Preferred examples of the ceramic material include alumina, zirconia, titania, magnesia, spinel, calcia, cordierite, zeolite, mullite, ferrite, zinc oxide, silicon carbide, and any combination thereof. More preferred are alumina, zirconia, titania, and any combination thereof. Particularly preferred are alumina and zirconia. Most preferred is alumina. The use of such a porous ceramic material facilitates the formation of a highly-densified LDH-containing separator layer. Preferred examples of the metal material include aluminum and zinc. Preferred examples of the polymer material include polystyrene, polyether sulfone, polypropylene, epoxy resins, polyphenylene sulfide, hydrophilized fluororesins (e.g., poly(tetrafluoroethylene) (PTFE)), and any combination thereof. More preferably, a material having alkali resistance (i.e., resistance to an electrolytic solution of a battery) is appropriately selected from among the preferred materials described above.

The porous substrate has an average pore size of preferably 0.001 to 1.5 μm, more preferably 0.001 to 1.25 μm, still more preferably 0.001 to 1.0 μm, particularly preferably 0.001 to 0.75 μm, most preferably 0.001 to 0.5 μm. These ranges make it possible to form a dense LDH-containing separator layer exhibiting water impermeability while ensuring desired water permeability in the porous substrate. In the present invention, the average pore size can be determined by measuring the largest length of each pore in an electron microscopic (SEM) image of the surface of the porous substrate. The magnification of the electron microscopic (SEM) image used in this measurement is 20,000 or more. All the measured pore sizes are listed in order of size to calculate the average, from which the subsequent 15 larger sizes and the subsequent 15 smaller sizes, i.e., 30 diameters in total, are selected in one field of view. The selected pore sizes of two fields of view are then averaged to yield the average pore size. The pore size can be measured by, for example, a length-measuring function of a SEM or image analysis software (e.g., Photoshop manufactured by Adobe).

The surface of the porous substrate has a porosity of preferably 10 to 60%, more preferably 15 to 55%, still more preferably 20 to 50%. These ranges make it possible to form a dense LDH-containing separator layer that exhibits water impermeability, while ensuring desired water permeability of the porous substrate. The surface porosity of the porous substrate is used in the present invention because it can be readily measured by image processing described below and substantially reflects the internal porosity of the porous substrate. Thus, if the surface of the porous substrate is dense, the inside of the porous substrate is also dense. In the present invention, the porosity at the surface of the porous substrate can be measured by a method involving image processing as follows: 1) an electron microscopic (SEM) image of the surface of the porous substrate is taken at a magnification of 10,000 or more; 2) the grayscale SEM image is read with an image analysis software, such as Photoshop (manufactured by Adobe); 3) a monochromatic binary image is prepared with tools named [image], [color compensation], and [binarization] in this order; and 4) the porosity (%) is calculated by dividing the number of pixels of the black area(s) by the number of all the pixels of the image. Preferably, the porosity is measured over a 6 μm×6 μm area of the surface of the porous substrate by image processing. More preferably, the porosities in three 6 m×6 μm areas selected at random are averaged for objective evaluation.

The separator layer is formed on and/or in the porous substrate, preferably on the porous substrate. For example, the separator layer 28 formed on the porous substrate 30 as illustrated in FIG. 2 is in the form of an LDH dense membrane, and the LDH dense membrane is typically composed of LDH. The separator layer 28' formed in the porous substrate 30 as illustrated in FIG. 3 is typically composed of at least a portion of the porous substrate 30 and LDH because LDH is densely formed in the porous substrate 30 (typically in pores in the surface and its vicinity of the porous substrate 30). The separator layer 28' illustrated in FIG. 3 is prepared through removal of a membrane portion of the separator layer 28 illustrated in FIG. 2 by any known technique, such as polishing or machining.

The separator layer preferably exhibits water impermeability and gas impermeability. For example, if water is brought into contact with one surface of the separator layer at 25° C. for one week, water does not permeate the separator layer, and if helium gas is fed to one surface of the separator layer under application of a differential pressure of 0.5 atm, helium gas does not permeate the separator layer. The separator layer composed of LDH preferably has a density sufficient to exhibit water impermeability and gas impermeability. If the functional membrane has local and/or incidental defects exhibiting water permeability, the defects may be filled with an appropriate repairing agent (e.g., an epoxy resin) for ensuring water impermeability and gas impermeability. Such a repairing agent does not necessarily exhibit hydroxide ion conductivity. In any case, the surface of the separator layer (typically LDH dense membrane) has a porosity of preferably 20% or less, more preferably 15% or less, still more preferably 10% or less, particularly preferably 7% or less. A lower porosity of the surface of the separator layer indicates a higher density of the separator layer (typically LDH dense membrane). Such a high density is preferred. The surface porosity of the separator layer is used in the present invention because it can be readily measured by image processing described below and substantially reflects the internal porosity of the separator layer. Thus, if the surface of the separator layer is dense, the inside of the separator layer is also dense. In the present invention, the porosity of the surface of the separator layer can be measured by a method involving image processing as follows: 1) an electron microscopic (SEM) image of the surface of the separator layer is taken at a magnification of 10,000 or more; 2) the grayscale SEM image is read with image analysis software, such as Photoshop (manufactured by Adobe); 3) a monochromatic binary image is prepared with tools named [image], [color compensation], and [binarization] in this order; and 4) the porosity (%) is calculated by dividing the number of pixels of the black area(s) by the number of all the pixels of the image. Preferably, the porosity is measured over a 6 m×6 μm area of the surface of the separator layer by image processing. More preferably, the porosities in three 6 m×6 μm areas selected at random are averaged for objective evaluation.

The layered double hydroxide is composed of an aggregation of platy particles (i.e., platy LDH particles). Preferably, these platy particles are oriented such that the tabular faces of the platy particles are perpendicular to or oblique to the surface of the porous substrate (i.e., the substrate surface). In particular, this preferred embodiment is applied to the case where the separator layer 28 is disposed in the form of an LDH dense membrane on the porous substrate 30 as illustrated in FIG. 2. Alternatively, this embodiment may be applied to the case where LDH is densely formed in the porous substrate 30 (typically in pores in the surface and its vicinity of the porous substrate 30), and the separator layer 28' is composed of at least a portion of the porous substrate 30 as illustrated in FIG. 3.

Figure 4:
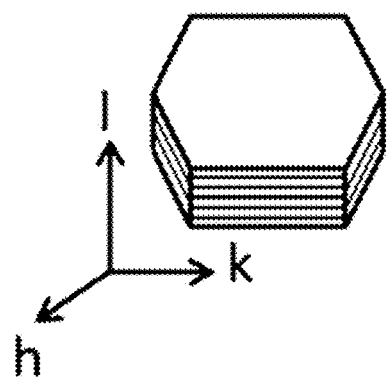
FIG. 4 is a schematic illustration of a platy particle of layered double hydroxide (LDH).

As illustrated in FIG. 4, the LDH crystal is in the form of a platy particle with a layered structure. The perpendicular or oblique orientation described above is significantly beneficial for the LDH-containing separator layer (e.g., LDH dense membrane), because an oriented LDH-containing separator layer (e.g., an oriented LDH dense membrane) exhibits anisotropic hydroxide ion conductivity, i.e., hydroxide ion conductivity along the orientation of the platy LDH particles (i.e., parallel to layers of LDH) is much greater than that perpendicular to the orientation of the platy LDH particles in the oriented LDH membrane. In fact, the present applicant has revealed that the hydroxide ion conductivity (S/cm) along the orientation of LDH particles in an oriented LDH bulk body is an order of magnitude greater than the hydroxide ion conductivity (S/cm) perpendicular to the orientation of LDH particles. Thus, the perpendicular or oblique orientation in the LDH-containing separator layer according to this embodiment fully or significantly leads to the anisotropic hydroxide ion conductivity of the oriented LDH to the thickness direction of the layer (i.e., the direction perpendicular to the surface of the separator layer or the surface of the porous substrate), whereby the conductivity in the thickness direction can be maximally or significantly increased. In addition, the LDH-containing separator layer has a layered structure and thus exhibits lower resistance than an LDH bulk block. The LDH-containing separator layer having such an orientation readily conducts hydroxide ions in the thickness direction of the layer. Because of its high density, the LDH-containing separator layer is very suitable for use as a separator that requires high conductivity across the thickness of the layer and high density.

In a particularly preferred embodiment, the LDH-containing separator layer (typically LDH dense membrane) is composed of the platy LDH particles highly oriented in the perpendicular direction. If the platy LDH particles are highly orientated in the perpendicular direction, the X-ray diffractometry of the surface of the separator layer shows substantially no peak of (003) plane or a peak of (003) plane smaller than that of (012) plane (note: this shall not apply to the case where the porous substrate shows a diffraction peak at the same angle as the peak of (012) plane of the platy LDH particles, because the peak of (012) plane of the platy LDH particles cannot be specified). This characteristic peak profile indicates that the platy LDH particles of the separator layer are oriented perpendicular to the separator layer. It should be noted that the term "perpendicular" as used herein refers to the idea including not only an exactly perpendicular direction but also a substantially perpendicular direction which is similar to the exactly perpendicular direction. The peak of (003) plane is strongest among peaks observed by X-ray diffractometry of non-oriented LDH powder. In contrast, the oriented LDH-containing separator layer shows substantially no peak of (003) plane or the peak of (003) plane smaller than the peak of (012) plane because platy LDH particles are oriented perpendicular to the separator layer. The reason for this is as follows: The c planes (001) including the (003) plane (where I is 3 or 6) are parallel to the layers of platy LDH particles. If the platy LDH particles are oriented perpendicular to the separator layer, the layers of platy LDH particles are also perpendicular to the separator layer and thus the X-ray diffractometry of the surface of the separator layer shows no peak or very small peak of (001) plane (where I is 3 or 6). The peak of (003) plane, if present, tends to be stronger than the peak of (006) plane, and the use of the peak of (003) plane facilitates determination of the perpendicular orientation as compared with the use of the peak of (006) plane. Thus, the oriented LDH-containing separator layer preferably shows substantially no peak of (003) plane or shows the peak of (003) plane smaller than the peak of (012) plane, which indicates that the highly perpendicular orientation is achieved.

The separator layer has a thickness of preferably 100 μm or less, more preferably 75 m or less, still more preferably 50 μm or less, particularly preferably 25 μm or less, most preferably 5 μm or less. Such a small thickness leads to a reduction in resistance of the separator. The separator layer is preferably formed as an LDH dense membrane on the porous substrate. In this case, the thickness of the separator layer corresponds to the thickness of the LDH dense membrane. If the separator layer is formed in the porous substrate, the thickness of the separator layer corresponds to the thickness of a composite layer composed of LDH and at least a portion of the porous substrate. If the separator layer is formed on and in the porous substrate, the thickness of the separator layer corresponds to the total thickness of the LDH dense membrane and the composite layer. In any case, the separator layer having the above thickness exhibits a low resistance suitable for use in, for example, a battery. The lower limit of the thickness of the oriented LDH membrane, which may vary with the intended use of the membrane, may be any value. In order to ensure the hardness desirable for use in a functional membrane, such as a separator, the thickness is preferably 1 μm or more, more preferably 2 μm or more.

The porous substrate-supported LDH separator is produced through a method involving (1) providing a porous substrate, (2) immersing the porous substrate in an aqueous stock solution containing magnesium ions ($Mg^{2+}$) and aluminum ions ($Al^{3+}$) in a total concentration of 0.20 to 0.40 mol/L and further containing urea, and (3) hydrothermally treating the porous substrate in the aqueous stock solution, to form a separator layer containing a layered double hydroxide on and/or in the porous substrate.

(1) Provision of Porous Substrate

As described above, the porous substrate is preferably composed of at least one selected from the group consisting of ceramic materials, metal materials, and polymer materials. The porous substrate is more preferably composed of a ceramic material. Preferred examples of the ceramic material include alumina, zirconia, titania, magnesia, spinel, calcia, cordierite, zeolite, mullite, ferrite, zinc oxide, silicon carbide, and any combination thereof. More preferred are alumina, zirconia, titania, and any combination thereof. Particularly preferred are alumina and zirconia. Most preferred is alumina. The use of such a porous ceramic material facilitates the formation of a highly-densified LDH-containing separator layer. In the case of a ceramic porous substrate, the porous substrate is preferably subjected to, for example, ultrasonic cleaning or cleaning with ion-exchange water.

(2) Immersion in Aqueous Stock Solution

The porous substrate is then immersed in the aqueous stock solution in a desired direction (e.g., horizontally or perpendicularly). For horizontal retention of the porous substrate, the porous substrate may be hanged up in or suspended in a container of the aqueous stock solution, or placed on the bottom of the container. For example, the porous substrate may be immobilized and suspended in the stock solution and away from the bottom of the container. For perpendicular retention of the porous substrate, a jig may be disposed that can hold the porous substrate perpendicularly to the bottom of the container. In any case, a preferred configuration or arrangement is one that can achieve growth of LDH perpendicular to the porous substrate (i.e., growth of LDH such that the tabular faces of platy LDH particles are perpendicular to or oblique to the surface of the porous substrate). The aqueous stock solution contains magnesium ions ($Mg^{2+}$) and aluminum ions ($Al^{3+}$) in a specific total concentration and further contains urea. Urea is hydrolyzed into ammonia and raises the pH of the aqueous stock solution, and metal ions co-existing in the aqueous stock solution form hydroxides, to produce LDH. The hydrolysis of urea, which also generates carbon dioxide, can form LDH having carbonate ions as anions. The aqueous stock solution contains magnesium ions ($Mg^{2+}$) and aluminum ions ($Al^{3+}$) in a total concentration of preferably 0.20 to 0.40 mol/L, more preferably 0.22 to 0.38 mol/L, still more preferably 0.24 to 0.36 mol/L, particularly preferably 0.26 to 0.34 mol/L. Such a preferred concentration range facilitates the nucleation and the crystal growth in a well-balanced manner and can form a highly-oriented, highly-densified LDH membrane. At a low total concentration of magnesium ions and aluminum ions, the crystal growth presumably dominates over the nucleation, resulting in a decrease in the number of LDH particles and an increase in size of the LDH particles. At a high total concentration, the nucleation presumably dominates over the crystal growth, resulting in an increase in the number of LDH particles and a decrease in size of the LDH particles.

Preferably, the aqueous stock solution contains dissolved magnesium nitrate and aluminum nitrate; i.e., the aqueous stock solution contains nitrate ions besides magnesium ions and aluminum ions. In this case, the molar ratio of the urea to the nitrate ions ($NO_3^-$) (i.e., urea/$NO_3$) in the aqueous stock solution is preferably 2 to 6, more preferably 4 to 5.

(3) Formation of LDH-Containing Separator Layer Through Hydrothermal Treatment

The porous substrate is hydrothermally treated in the aqueous stock solution to form the LDH-containing separator layer on and/or in the porous substrate. The hydrothermal treatment is performed in a hermetic container at a temperature of preferably 60 to 150° C., more preferably 65 to 120° C., still more preferably 65 to 100° C., particularly preferably 70 to 90° C. The hydrothermal treatment temperature may have any upper limit without causing thermal deformation of the porous substrate (e.g., a polymer substrate). The temperature can be elevated at any rate in the hydrothermal treatment. The temperature elevation rate may be 10 to 200° C./h, and preferably 100 to 200° C./h, more preferably 100 to 150° C./h. The time for the hydrothermal treatment may be determined depending on the target density or thickness of the LDH-containing separator layer.

After the hydrothermal treatment, the porous substrate is removed from the hermetic container, and then preferably cleaned with ion-exchange water.

The LDH-containing separator layer in the LDH-containing composite material produced as described above is composed of densely assembled platy LDH particles that are oriented in the perpendicular direction, which is beneficial for the conductivity. Thus, the LDH-containing separator layer is very suitable for use in a nickel-zinc battery that has suffered from growth of dendritic zinc which is an obstacle to practical use of this battery.

The above-described method may form LDH-containing separator layers on the two surfaces of the porous substrate. Thus, in order to modify the LDH-containing composite material into a form suitable for use as a separator, the LDH-containing separator layer on one surface of the porous substrate is preferably removed through mechanical scraping after the formation of the separator layers. Alternatively, it is desirable to take a measure to prevent formation of the LDH-containing separator layer on one surface of the porous substrate in advance.

EXAMPLES

The present invention will now be described in more detail by way of examples.

Example 1: Preparation and Evaluation of Porous Substrate-Supported LDH Separator (1) Preparation of Porous Substrate Boehmite (DISPAL 18N4-80, manufactured by Sasol Limited), methyl cellulose, and ion-exchange water were weighed in proportions by mass of 10:1:5, and were then kneaded together. The kneaded product was subjected to extrusion molding with a hand press into a plate having a size sufficiently exceeding 5 cm×8 cm and a thickness of 0.5 cm. The resultant green body was dried at 80° C. for 12 hours and then fired at 1,150° C. for three hours, to prepare an alumina porous substrate. The porous substrate was cut into a piece of 5 cm×8 cm.

Figure 5:
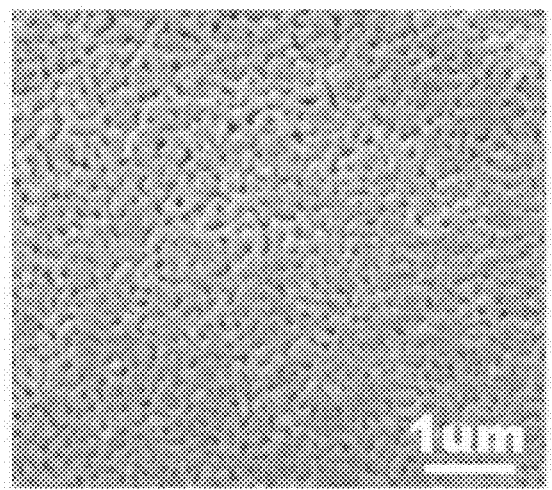
FIG. 5 is a SEM image of the surface of a porous alumina substrate prepared in Example 1.

The porosity at the surface of the resultant porous substrate was determined by a method involving image processing. The porosity was 24.6%. The porosity was determined as follows: 1) a scanning electron microscopic (SEM) image of the surface microstructure of the porous substrate was taken with a scanning electron microscope (SEM; JSM-6610LV, manufactured by JEOL Ltd.) (magnification: 10,000 or more) at an acceleration voltage of 10 to 20 kV; 2) the grayscale SEM image was read with image analysis software, such as Photoshop (manufactured by Adobe); 3) a monochromatic binary image was prepared with tools named [image], [color compensation], and [binarization] in this order; and 4) the porosity (%) was determined by dividing the number of pixels of the black areas by the number of all the pixels of the image. The porosity was determined over a 6 μm×6 μm area of the surface of the porous substrate. FIG. 5 illustrates the SEM image of the surface of the porous substrate.

The average pore size of the porous substrate was about 0.1 Vim. In the present invention, the average pore size was determined by measuring the largest length of each pore in a scanning electron microscopic (SEM) image of the surface of the porous substrate. The magnification of the scanning electron microscopic (SEM) image used in this measurement was 20,000. All the measured pore sizes were listed in order of size to calculate the average, from which the subsequent 15 larger sizes and the subsequent 15 smaller sizes, i.e., 30 sizes in total, were selected in one field of view. The average was determined for two fields of view. The pore sizes were measured by, for example, a length-measuring function of SEM software.

(2) Cleaning of Porous Substrate

The resultant porous substrate was ultrasonically cleaned in acetone for five minutes, in ethanol for two minutes, and then in ion-exchange water for one minute.

(3) Preparation of Aqueous Stock Solution

Magnesium nitrate hexahydrate ($Mg(NO_3)_2 \cdot 6H_2O$, manufactured by KANTO CHEMICAL Co., Inc.), aluminum nitrate nonahydrate ($Al(NO_3)_3 \cdot 9H_2O$, manufactured by KANTO CHEMICAL Co., Inc.), and urea (($NH_2)_2CO$, manufactured by Sigma-Aldrich Corporation) were provided as raw materials for an aqueous stock solution. Magnesium nitrate hexahydrate and aluminum nitrate nonahydrate were weighed and placed in a beaker, and then ion-exchange water was added to the beaker to achieve a total volume of 600 mL, a ratio of the cations ($Mg^{2+}/Al^{3+}$) of 2, and a molar concentration of the total metal ions (i.e., $Mg^{2+}$ and $Al^{3+}$) of 0.320 mol/L. The resultant solution was agitated and urea was then added to the solution. The added urea was weighed in advance to give a urea/$NO_3^-$ ratio of 4. The resultant solution was further agitated to prepare an aqueous stock solution.

(4) Formation of Membrane by Hydrothermal Treatment

The aqueous stock solution prepared in the above procedure (3) and the porous substrate cleaned in the above procedure (2) were enclosed together in a hermetic Teflon (registered trademark) container (with an internal volume of 800 mL and a stainless steel jacket). The porous substrate was horizontally suspended and immobilized away from the bottom of the hermetic Teflon (registered trademark) container such that the opposite surfaces of the porous substrate came into contact with the aqueous stock solution. Thereafter, the porous substrate was subjected to hydrothermal treatment at a hydrothermal temperature of 70° C. for 168 hours (7 days), to form oriented layered double hydroxide membranes (separator layers) on the surfaces of the substrate. After the elapse of a predetermined period of time, the porous substrate was removed from the hermetic container, cleaned with ion-exchange water, and then dried at 70° C. for 10 hours, to form a dense membrane of the layered double hydroxide (LDH) on the porous substrate (hereinafter the dense membrane will be referred to as "membrane sample"). The thickness of the membrane sample was about 1.5 μm. A layered double hydroxide-containing composite material sample (hereinafter referred to as "composite material sample") was thereby prepared. LDH membranes were formed on the opposite surfaces of the porous substrate. In order to use the composite material as a separator, the LDH membrane on one surface of the porous substrate was mechanically removed.

(5) Evaluations (5a) Identification of Membrane Sample

Figure 6:
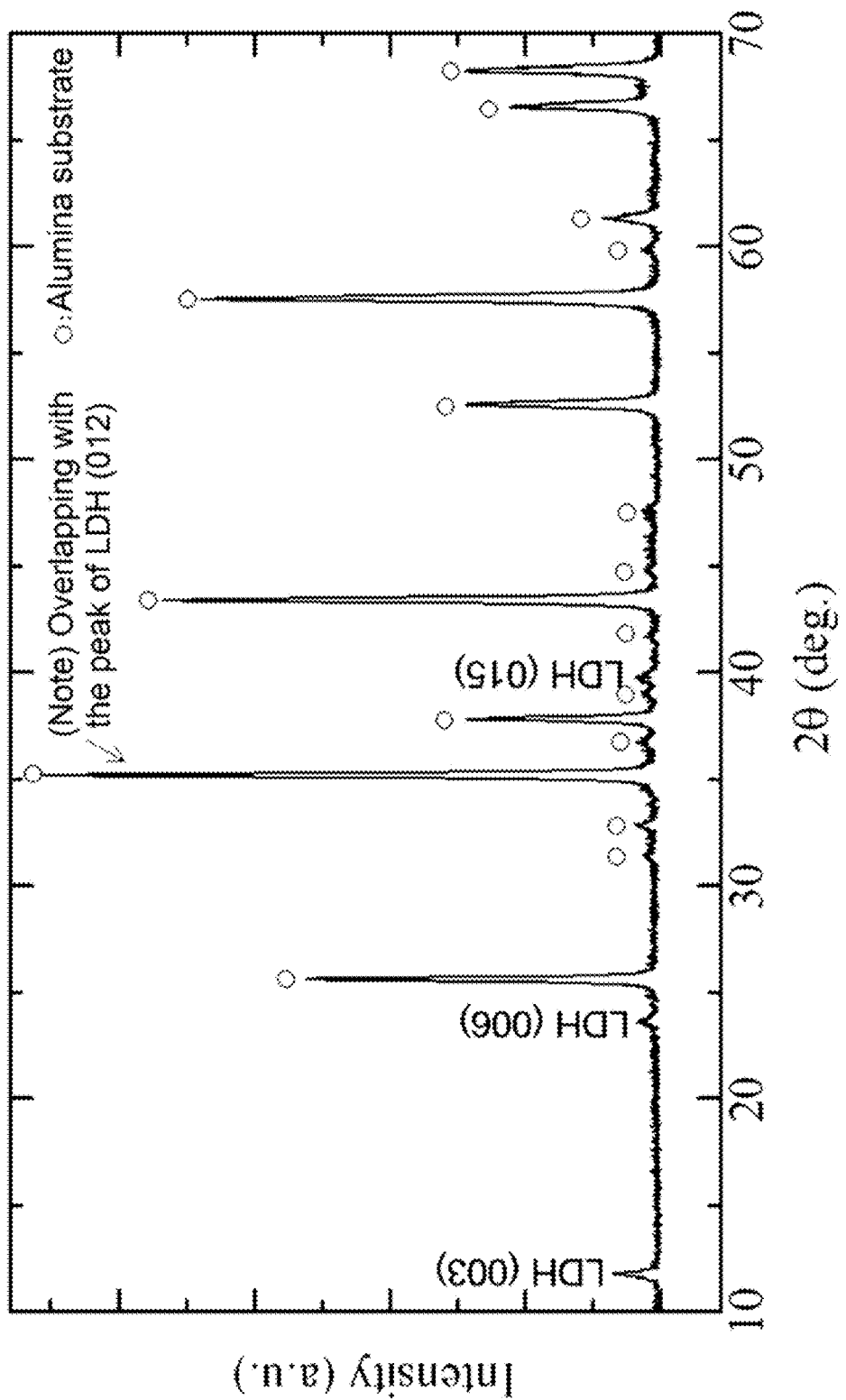
FIG. 6 is an XRD profile of a crystalline phase of a sample in Example 1.

A crystalline phase of a membrane sample was analyzed with an X-ray diffractometer (RINT-TTR III, manufactured by Rigaku Corporation) at a voltage of 50 kV, a current of 300 mA, and a measuring range of 10° to 70°. The resultant XRD profile is illustrated in FIG. 6. The XRD profile was compared with the diffraction peaks of a layered double hydroxide (or a hydrotalcite compound) described in JCPDS card No. 35-0964 for identification of the membrane sample. The membrane sample was identified as a layered double hydroxide (LDH, or a hydrotalcite compound). As shown in the XRD profile of FIG. 6, peaks derived from alumina in the porous substrate on which the membrane sample was formed (i.e., the peaks marked with a circle) were also observed.

(5b) Observation of Microstructure

Figure 7:
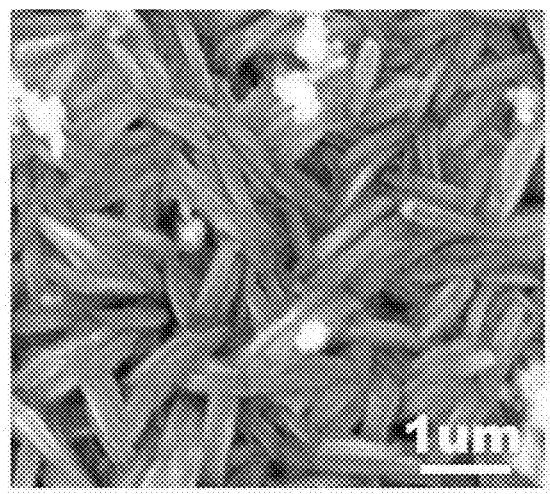
FIG. 7 is a SEM image of a surface microstructure of a sample membrane in Example 1.

The surface microstructure of the membrane sample was observed with a scanning electron microscope (SEM; JSM-6610LV, manufactured by JEOL Ltd.) at an acceleration voltage of 10 to 20 kV. FIG. 7 illustrates the resultant SEM image (i.e., a secondary electron image) of the surface microstructure of the membrane sample.

Figure 8:
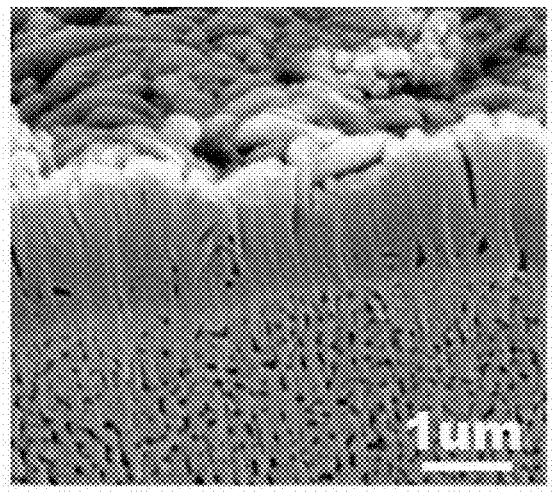
FIG. 8 is a SEM image of a microstructure at a polished cross-sectional surface of a composite material sample in Example 1.

A cross-section of the composite material sample was subjected to CP polishing, and the microstructure of the polished cross-section was observed with a scanning electron microscope (SEM) at an acceleration voltage of 10 to 20 kV. FIG. 8 illustrates the resultant SEM image of the microstructure of the polished cross-section of the composite material sample.

(5c) Measurement of Porosity

The porosity at the surface of the membrane sample was determined by a method involving image processing. Specifically, the porosity was determined as follows: 1) a scanning electron microscopic (SEM) image of the surface microstructure of the membrane was taken with a scanning electron microscope (SEM; JSM-6610LV, manufactured by JEOL Ltd.) (magnification: 10,000 or more) at an acceleration voltage of 10 to 20 kV; 2) the grayscale SEM image was read with image analysis software, such as Photoshop (manufactured by Adobe); 3) a monochromatic binary image was prepared with tools named [image], [color compensation], and [binarization] in this order; and 4) the porosity (%) was determined by dividing the number of pixels of the black areas by the number of all the pixels of the image. The porosity was determined over a 6 μm×6 μm area of the surface of the oriented membrane. The porosity was 19.0%. This porosity was used to calculate the density D of the surface of the membrane (hereinafter referred to as "membrane surface density") by the expression: D=100%−(the porosity at the surface of the membrane). The density D was 81.0%.

The porosity at the polished cross-section of the membrane sample was also determined. The porosity was determined as in the above procedure of determining the porosity at the surface of the membrane, except for taking an electron microscopic (SEM) image of the polished cross-section along the thickness of the membrane at a magnification of 10,000 or more (through the above procedure (5b)). The determination of the porosity was performed on the cross-section of the membrane portion in the oriented membrane sample. The porosity at the polished cross-section of the membrane sample was 3.5% on average (i.e., the average porosity of three polished cross-sections). The results demonstrate a significantly high density of the membrane formed on the porous substrate.

(5d) Density Evaluation Test I

Figure 9A:
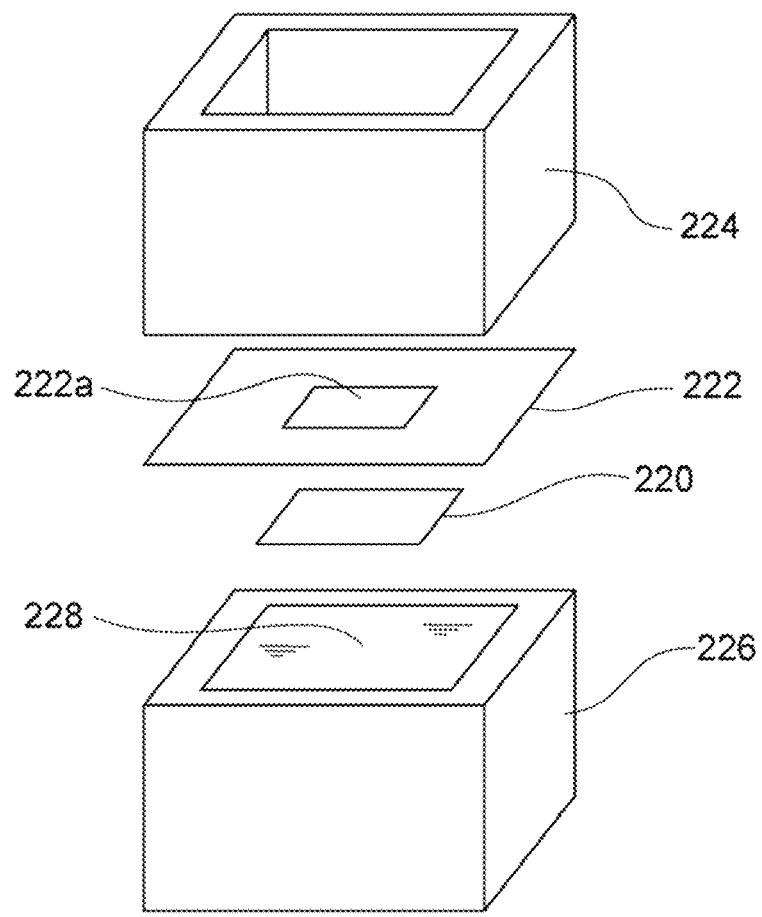
FIG. 9A is an exploded perspective view of a system for evaluating and measuring density in Example 1.
Figure 9B:
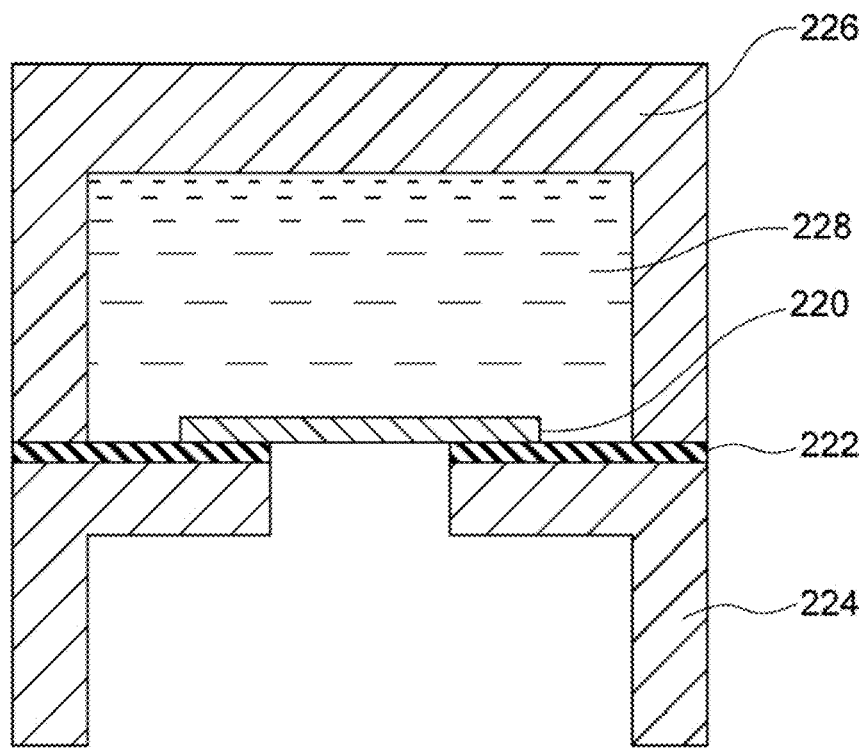
FIG. 9B a schematic cross-sectional view of a system for evaluating and measuring density in Example 1.

The following density evaluation test was performed on the membrane sample for determining whether the sample has high density and thus water impermeability. With reference to FIG. 9A, a silicone rubber 222 having a central opening 222a (0.5 cm×0.5 cm) was bonded to the membrane sample of composite material sample 220 prepared in (1) above (cut into a piece of 1 cm×1 cm), and the resultant laminate was disposed between two acrylic units 224 and 226 and bonded to these acrylic units. The acrylic unit 224 disposed on the silicone rubber 222 has no bottom, and thus the silicone rubber 222 is bonded to the acrylic unit 224 such that the opening 222a is exposed. The acrylic unit 226 disposed on the porous substrate of the composite material sample 220 has a bottom and contains ion-exchange water 228. In this case, Al and/or Mg may be dissolved in the ion-exchange water. Thus, these components are arranged to form an assembly such that the ion-exchange water 228 comes into contact with the porous substrate of the composite material sample 220 if the assembly is inverted upside down. After formation of the assembly, the total weight thereof was measured. It should be noted the unit 226 has a closed vent (not shown) and the vent is opened after inversion of the assembly. As illustrated in FIG. 9B, the assembly was inverted upside down and left for one week at 25° C., and then the total weight thereof was measured again. Before measurement of the weight of the assembly, water droplets on the inner side(s) of the acrylic unit 224 were wiped off, if any. The density of the membrane sample was evaluated on the basis of the difference between the total weights of the assembly before and after the inversion. No change in weight of the ion-exchange water was observed even after the one-week test at 25° C. The results demonstrate that the membrane sample (i.e., functional membrane) exhibits high density and thus water impermeability.

(5e) Density Evaluation Test II

Figure 10A:
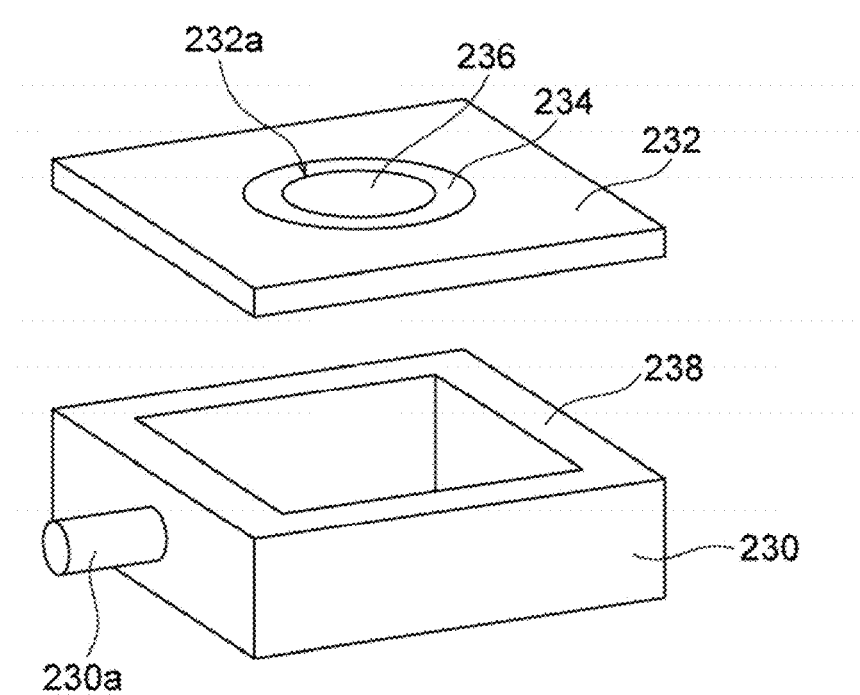
FIG. 10A is an exploded perspective view of a hermetic container used in density evaluation test II in Example 1.
Figure 10B:
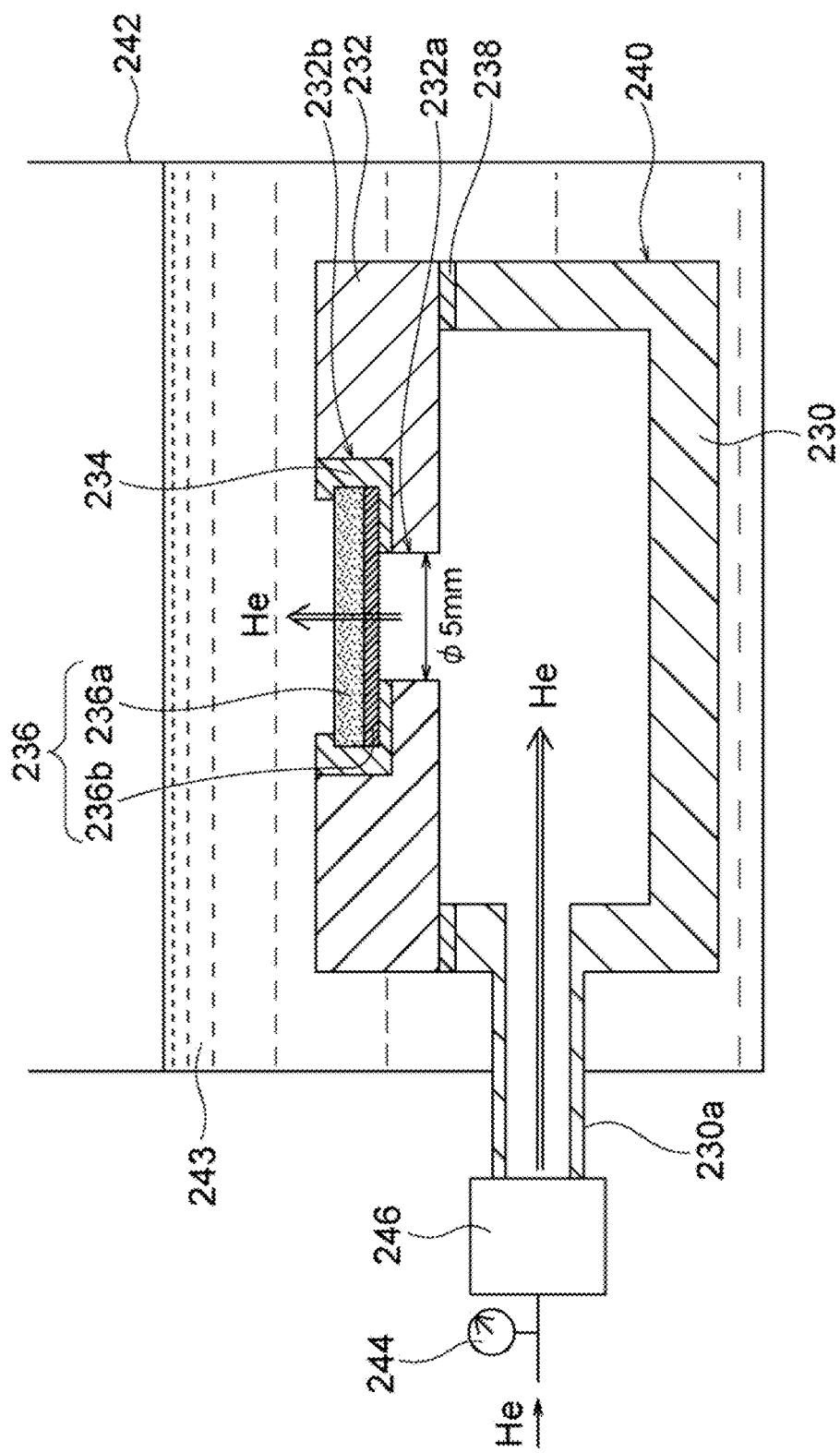
FIG. 10B is a schematic cross-sectional view of a system used in density evaluation test II in Example 1.

The following density evaluation test was performed on the membrane sample for determining whether the sample has high density and thus gas impermeability. As illustrated in FIGS. 10A and 10B, an acrylic container 230 and an alumina jig 232 were provided. The container 230 has no lid, and the jig 232 has a shape and a size such that it serves as a lid for the container 230. The acrylic container 230 has a gas inlet 230a for feeding a gas into the container 230. The alumina jig 232 has an opening 232a having a diameter of 5 mm, and a dent 232b provided around the opening 232a for supporting the membrane sample. An epoxy adhesive 234 was applied to the dent 232b of the alumina jig 232, and a membrane sample 236b of a composite material sample 236 was placed on the dent 232b and gas- and liquid-tightly bonded to the alumina jig 232. The alumina jig 232 provided with the composite material sample 236 was gas- and liquid-tightly bonded to the upper edge of the acrylic container 230 with a silicone adhesive 238 so as to completely cover the opening of the acrylic container 230, to prepare a hermetic container 240 for evaluation. The hermetic container 240 was placed in a water bath 242, and the gas inlet 230a of the acrylic container 230 was connected to a pressure gauge 244 and a flowmeter 246 so as to allow helium gas to be fed into the acrylic container 230. Water 243 was poured into the water bath 242 such that the hermetic container 240 was completely submerged in the water. The hermetic container 240 was ensured to have gas tightness and liquid tightness. The membrane sample 236b of the composite material sample 236 was exposed to the inner space of the hermetic container 240, and the porous substrate 236a of the composite material sample 236 was in contact with the water in the water bath 242. Helium gas was fed into the hermetic container 240 through the gas inlet 230a of the acrylic container 230. The pressure gauge 244 and the flowmeter 246 were monitored to achieve a differential pressure of 0.5 atm at the membrane sample 236b (i.e., the pressure applied to the surface in contact with helium gas was higher by 0.5 atm than water pressure applied to the opposite surface), to determine the presence of helium gas bubbles in the water caused by permeation of helium gas through the composite material sample 236. No helium gas bubbles were observed. The results demonstrate that the membrane sample 236b has high density and thus gas impermeability.

Figure 11A:
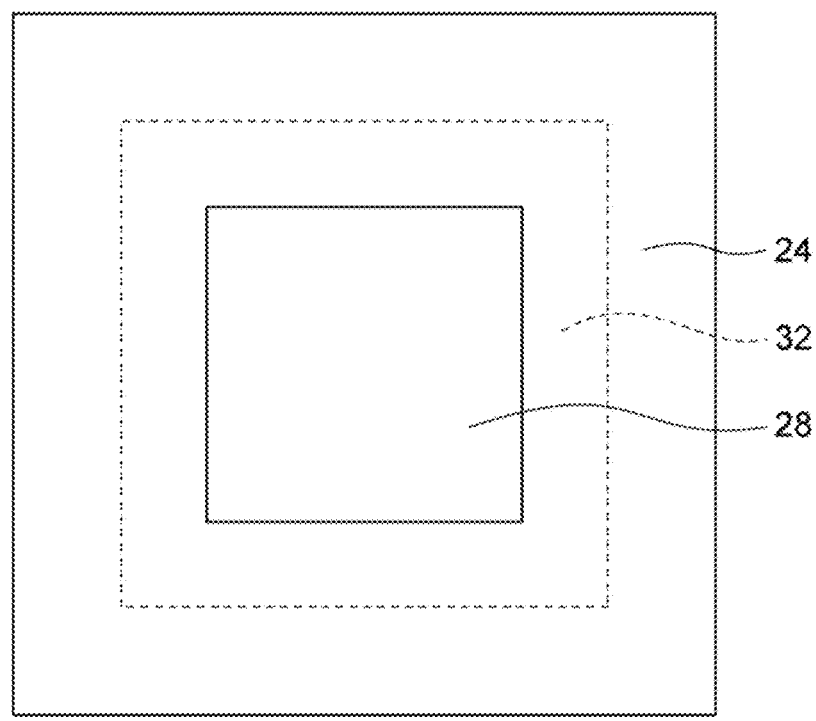
FIG. 11A is a schematic top view of the positioning of each element of a separation sheet.
Figure 11B:
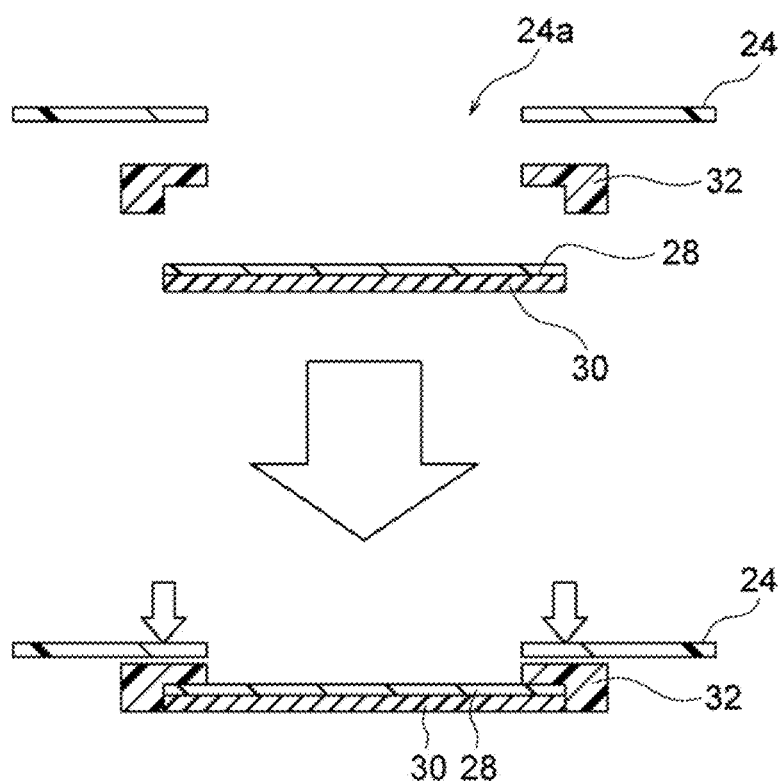
FIG. 11B is a process chart illustrating a process of producing a separation sheet.
Figure 12:
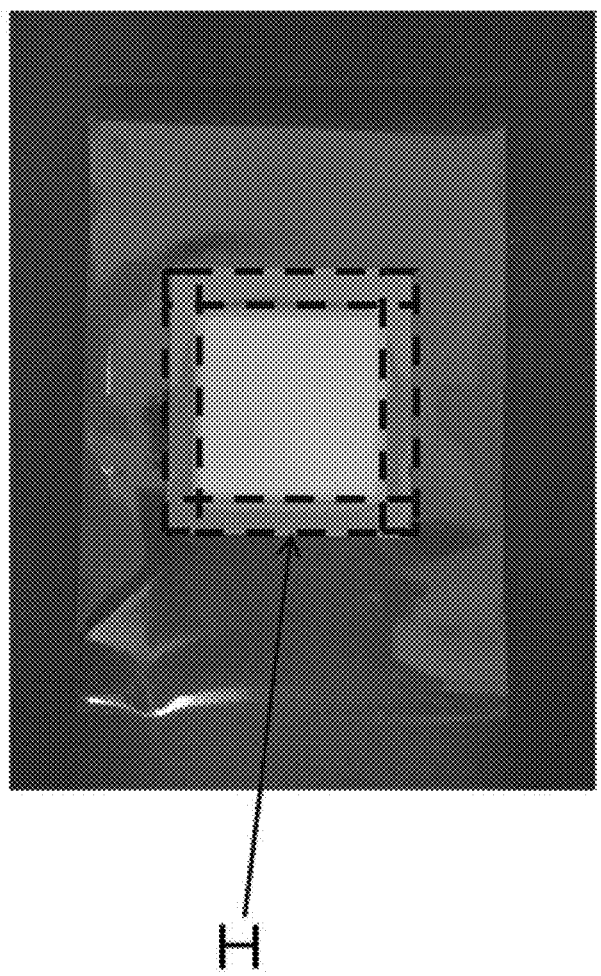
FIG. 12 is a photograph of a separation sheet produced in Example 2.

Example 2: Preparation of Nickel-Zinc Cell Pack (1) Preparation of Separation Sheet An alumina substrate-supported LDH membrane was prepared as a porous substrate-supported separator, as in the Example 1. As shown in FIGS. 11A and 11B, a separator 28 supported by a porous substrate 30 had a frame 32 of modified polyphenylene ether resin disposed along the outer periphery of the separator 28 (i.e. the LDH membrane). In this embodiment, the frame 32 had a square shape, and had a step in its inner periphery such that the outer periphery of the porous substrate 30 and the separator 28 was fitted in the step. A laminate film (manufactured by AS ONE Corporation; product name: plastic bag for vacuum sealer; thickness: 50 µm; materials: PP resin (base film) and PE resin (thermoplastic resin)) was placed on the frame 32 as a flexible film 24. The flexible film 24 had a central opening 24a formed in advance, and was disposed such that the opening 24a corresponds to the open area in the frame 32. The joint portions of the flexible film 24 with the frame 32 and of the frame 32 with the separator 28 supported by the porous substrate 30 were sealed by thermal bonding at about 200° C. with a commercially available heat sealer. A photograph of the resulting separation sheet is shown in FIG. 12, where the region H defined by the dotted lines represents the area of sealing by thermal bonding such that the area is ensured to have liquid tightness.

(2) Preparation of Positive-Electrode Plate

Particulate nickel hydroxide containing zinc and cobalt in the form of solid solution was prepared. The particulate nickel hydroxide was coated with cobalt hydroxide to yield a positive-electrode active material. The resulting positive-electrode active material was mixed with a 2% aqueous carboxymethyl cellulose solution to prepare a paste. The paste was evenly applied to a collector composed of a nickel porous substrate having a porosity of about 95% and was dried such that the porosity of the positive-electrode active material was 50%, to prepare a positive-electrode plate having a predetermined region coated with the active material.

(3) Preparation of Negative-Electrode Plate

A mixture of powdery zinc oxide (80 parts by weight), powdery zinc (20 parts by weight), and particulate polytetrafluoroethylene (3 parts by weight) was applied onto a collector composed of punched copper sheet, to prepare a negative-electrode plate having a porosity of about 50% and a predetermined region coated with the active material.

(4) Preparation of Nickel-Zinc Cell Pack

Figure 13:
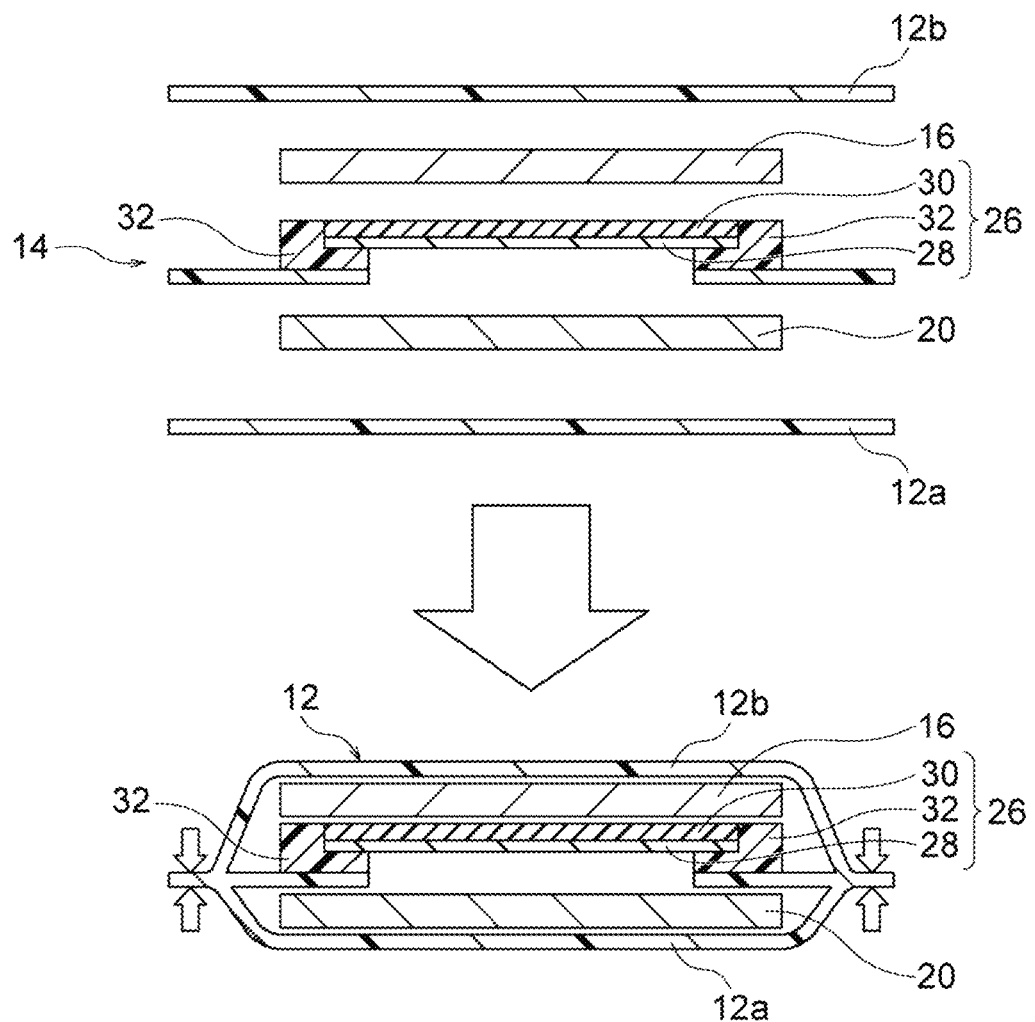
FIG. 13 is a process chart illustrating a process of assembling a nickel-zinc cell pack.
Figure 14:
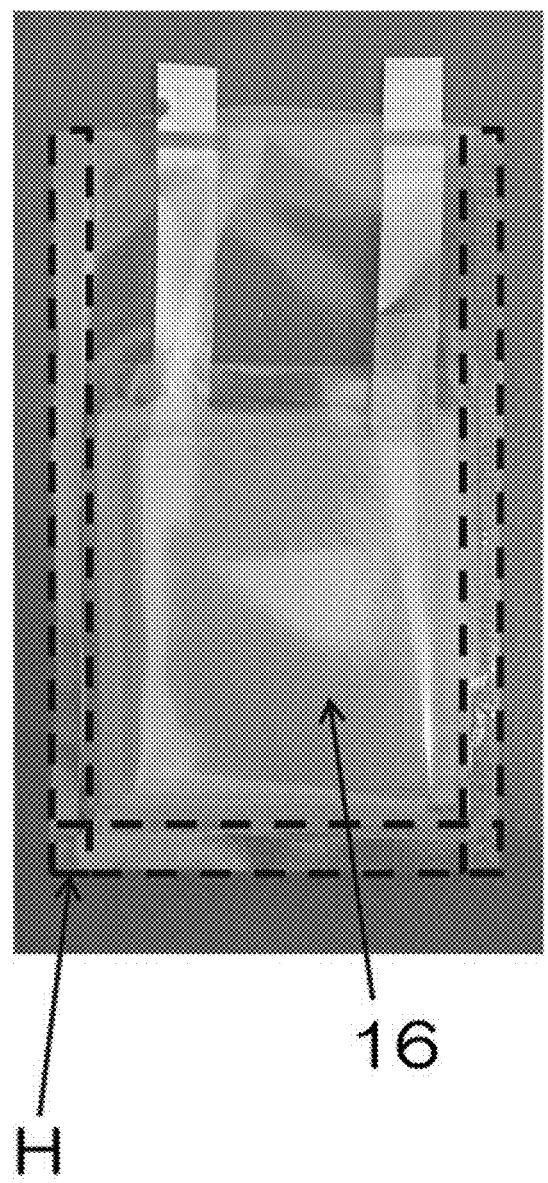
FIG. 14 is a photograph taken from the positive-electrode side showing a flexible bag produced in Example 2 by thermal bonding of flexible films in their three respective outer peripheral sides.
Figure 15A:
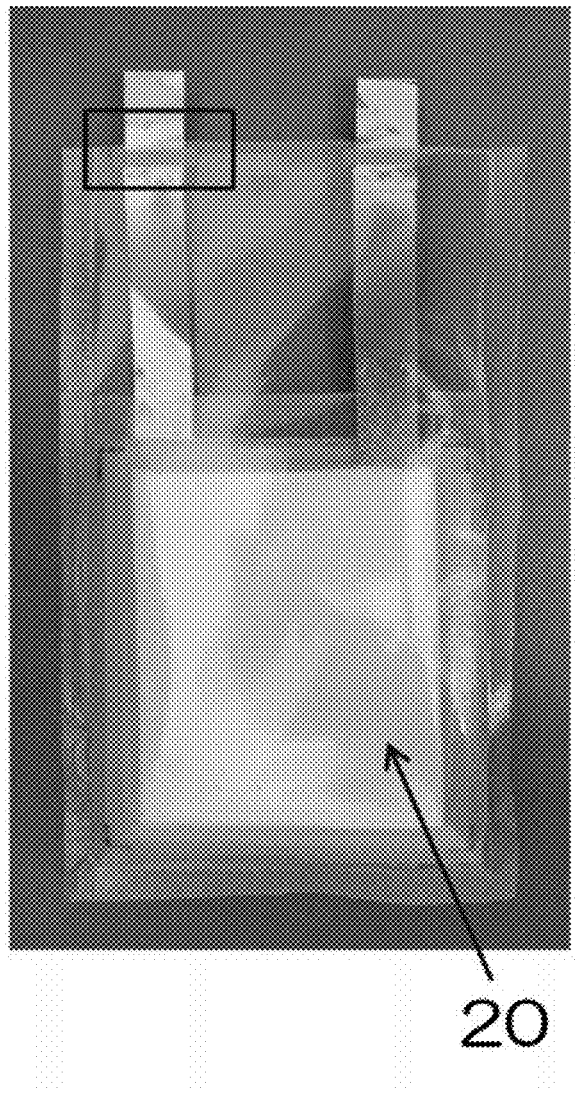
FIG. 15A is a photograph taken from the negative-electrode side showing the flexible bag produced in Example 2 by thermal bonding of flexible films in their three respective outer peripheral sides.
Figure 15B:
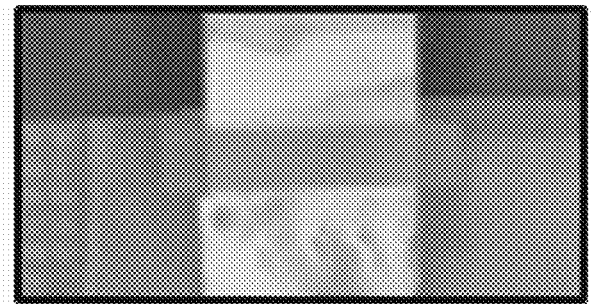
FIG. 15B is an enlarged photograph of the area highlighted by the frame in the upper edge of the flexible bag in FIG. 15A.
Figure 16:
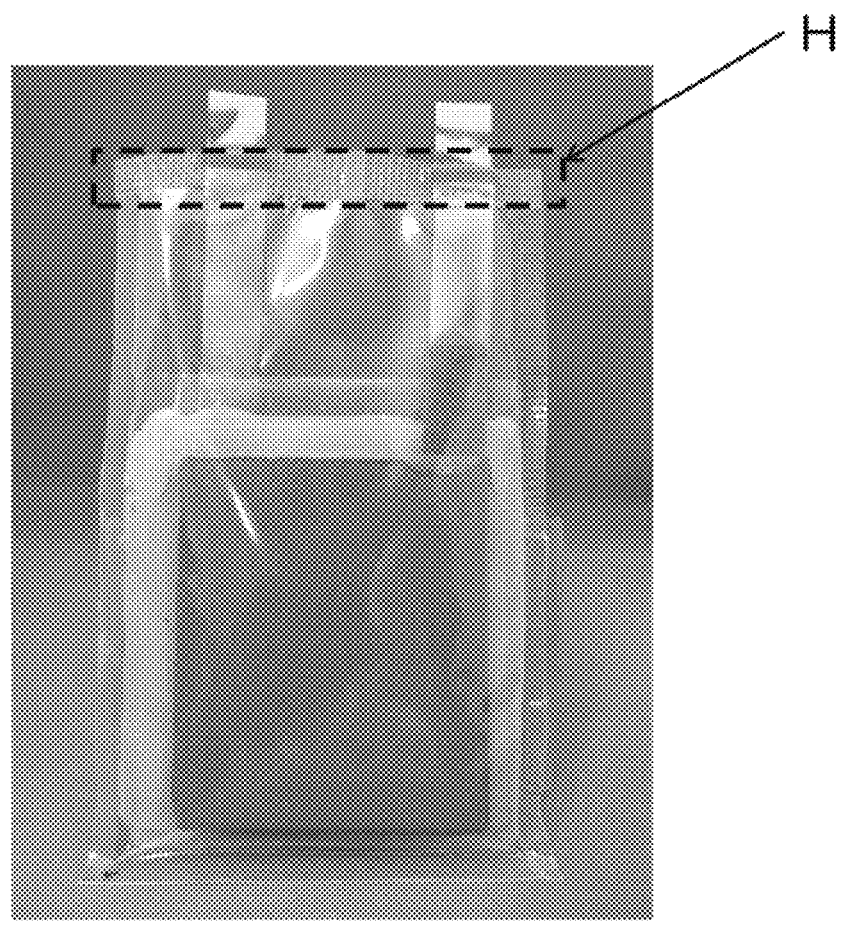
FIG. 16 is a photograph of a nickel-zinc cell pack produced in Example 2 (with the opening in the upper edge sealed by thermal bonding).

The separation sheet 14, the positive electrode 16, and the negative electrode 20 prepared above were used to produce a nickel-zinc cell pack 10 shown in FIG. 1A by the following procedure. Laminate films (manufactured by AS ONE Corporation; product name: plastic bag for vacuum sealer; thickness: 50 µm; materials: PP resin (base film) and PE resin (thermoplastic resin)) were prepared for use as a pair of flexible films 12a and 12b. As shown in FIG. 13, the flexible film 12a, the negative electrode 20, the separation sheet 14, the positive electrode 16, and the flexible film 12b were stacked in this order. The separation sheet 14 was disposed such that the porous substrate 30 with the frame 32 was positioned on a surface, adjacent to the positive electrode 16, of the separation sheet 14. The flexible films 12a and 12b each had the three outer peripheral sides (the sides other than the upper edge) respectively overlapping with the three outer peripheral sides (the sides other than the upper edge) of the flexible film 24 of the separation sheet 14, and the overlapped portions (their three respective outer peripheral sides) of the flexible films 12a, 23, and 12b were bonded by thermal bonding at about 200° C. with a commercially available heat sealer. FIG. 14 is a photograph taken from the positive electrode 16 showing the flexible bag 12 thus prepared by liquid-tightly sealing flexible films by thermal bonding, where the region H defined by the dotted lines represents the area of sealing by thermal bonding of the three respective outer peripheral sides. At this point, as shown in FIG. 14, the upper edge of the flexible bag is not sealed and is open, and the positive-electrode collector and the negative-electrode collector (corresponding to the two metal pieces observed in FIG. 14) each extend from the outer periphery of the flexible bag at different positions. The positive- and negative-electrode collectors shown in FIG. 5 are very long because of some constraints in trial production, but are preferably be shorter than those in FIG. 5 in practical production, such that extra spaces are not unnecessarily large. FIG. 15A is a photograph taken from the negative electrode showing the flexible bag prepared by sealing of flexible films by thermal bonding. In the area highlighted by the frame in the upper edge of the flexible bag in FIG. 15A (an enlarged photograph of the area is shown in FIG. 15B), a grey line is observed. As the grey line shows, each collector (metal piece) has a sealant film for thermal bonding (manufactured by Sumitomo Electric Industries, Ltd.; product name: MINUS LEAD (TAB-LEAD); material: polyolefin resin) in the portion to be in contact with the upper edge of the flexible bag, to promote welding with the flexible film during thermal bonding. Such configuration allows reliable bonding of the upper edge of the flexible bag and the collectors (metal pieces) to be in contact with the flexible bag (i.e. bonding of different materials) during subsequent bonding step by thermal bonding. The resulting flexible bag 12 containing the separation sheet 14, the positive electrode 16 and the negative electrode 20 was placed in a vacuum desiccator, and 6 mol/L of aqueous KOH electrolytic solution was placed into each of the positive-electrode chamber 15 and the negative-electrode chamber 19 in the flexible bag 12 in the vacuum atmosphere. The electrolytic solution was fed through the opening disposed in the upper edge of the flexible bag 12. Finally, the opening in the upper edge of the flexible bag 12 was sealed by thermal bonding at about 200° C. with a commercially available heat sealer, to prepare a nickel-zinc cell pack 10. FIG. 16 is a photograph of the nickel-zinc cell pack 10 with the upper edge sealed by thermal bonding, where the region H boxed by a dotted line, i.e. the one outer peripheral side (the upper edge), is the portion of sealing by thermal bonding.

What is claimed is:

1. A nickel-zinc cell pack comprising:
   a flexible bag comprising a flexible film;
   a separation sheet to separate a positive-electrode chamber and a negative-electrode chamber for inhibiting liquid communication therebetween;
   a positive electrode comprising nickel hydroxide and/or nickel oxyhydroxide and disposed in the positive-electrode chamber;
   a positive-electrode electrolytic solution comprising alkali metal hydroxide and disposed in the positive-electrode chamber, the positive electrode being immersed in the positive-electrode electrolytic solution;
   a negative electrode comprising zinc and/or zinc oxide and disposed in the negative-electrode chamber; and
   a negative-electrode electrolytic solution comprising alkali metal hydroxide and disposed in the negative-electrode chamber, the negative electrode being immersed in the negative-electrode electrolytic solution,
   wherein the separation sheet comprises a flexible film having an opening, and a separator structure comprising a separator exhibiting hydroxide-ion conductivity and water impermeability, and a frame along the outer periphery of the separator, and
   wherein the separator structure liquid-tight seals to opening in the flexible film of the separation sheet, and the flexible film of the separation sheet is directly bonded liquid-tightly to the separator structure and the interior of the flexible bag with the frame disposed therebetween.

2. The nickel-zinc cell pack according to claim 1, wherein the flexible films of the flexible bag and the separation sheet each contain a resin film.

3. The nickel-zinc cell pack according to claim 1, wherein the flexible bag comprises a pair of flexible films sealed by thermal bonding at their outer peripheries except for at least the upper edge.

4. The nickel-zinc cell pack according to claim 3, wherein the flexible film of the separation sheet is bonded by thermal bonding together with and between the pair of flexible films in their outer peripheries except for at least the upper edge.

5. The nickel-zinc cell pack according to claim 1, wherein the frame is a resin frame and is bonded to the flexible film of the separation sheet with an adhesive and/or by thermal bonding.

6. The nickel-zinc cell pack according to claim 1, wherein the positive-electrode chamber has an extra positive-electrode space having a volume that meets a variation in amount of water in association with reaction at the positive electrode during charge and discharge, and the negative-electrode chamber has an extra negative-electrode space having a volume that meets a variation in amount of water in association with reaction at the negative electrode during charge and discharge.

7. The nickel-zinc cell pack according to claim 6, wherein the flexible bag, the separation sheet, the positive electrode, and the negative electrode are vertically disposed, the extra positive-electrode space is provided in an upper portion of the positive-electrode chamber, and the extra negative-electrode space is provided in an upper portion of the negative-electrode chamber.

8. The nickel-zinc cell pack according to claim 1, wherein the separator comprises an inorganic solid electrolyte.

9. The nickel-zinc cell pack according to claim 8, wherein the inorganic solid electrolyte has a relative density of 90% or more.

10. The nickel-zinc cell pack according to claim 8, wherein the inorganic solid electrolyte comprises a layered double hydroxide.

11. The nickel-zinc cell pack according to claim 8, wherein the separator structure further comprises a porous substrate on either or both of the surfaces of the separator.

12. The nickel-zinc cell pack according to claim 11, wherein the inorganic solid electrolyte is in a membrane or layer form, and is disposed on or in the porous substrate.

13. The nickel-zinc cell pack according to claim 11, wherein the separator is disposed on a surface, adjacent to the negative-electrode, of the porous substrate.

14. The nickel-zinc cell pack according to claim 13, wherein the separator structure comprises a frame along the outer periphery of the separator; the frame comprising:
- an outer frame having an opening capable of accommodating the separator and the porous substrate; and
- an inner frame extending from an end and/or a portion near an end, adjacent to the positive electrode, of the outer frame toward the opening and engaging with a surface, adjacent to the positive electrode, of the porous substrate;
- wherein a joint portion of the frame with the porous substrate or with both the porous substrate and the separator is liquid-tightly sealed with an adhesive.

15. The nickel-zinc cell pack according to claim 10, wherein the separator structure further comprises a porous substrate on either or both of the surfaces of the substrate, wherein the layered double hydroxide comprises an aggregation of platy particles, and the platy particles are oriented such that the tabular faces of the platy particles are perpendicular to or oblique to the surface of the porous substrate.

16. The nickel-zinc cell pack according to claim 1, further comprising a positive-electrode collector in contact with the positive electrode, and a negative-electrode collector in contact with the negative electrode, wherein the positive-electrode collector and the negative-electrode collector extend from different positions of the outer periphery of the flexible bag.

17. An assembled battery comprising a battery container and a plurality of nickel-zinc cell packs disposed in the battery container, each pack according to claim 1.

* * * * *